United States Patent [19]
Motegi

[11] Patent Number: 5,777,444
[45] Date of Patent: Jul. 7, 1998

[54] DRIVE DEVICE FOR A VIBRATION ACTUATOR WHICH PREVENTS THE COGGING PHENOMENON

[75] Inventor: Kiyoshi Motegi, Yokohama, Japan

[73] Assignee: Nikon Corporation, Tokyo, Japan

[21] Appl. No.: 774,347

[22] Filed: Dec. 27, 1996

[30] Foreign Application Priority Data

Dec. 27, 1995 [JP] Japan .................................. 7-341094
Jan. 26, 1996 [JP] Japan .................................. 8-012022

[51] Int. Cl.$^6$ .................................................. H02N 2/00
[52] U.S. Cl. .......................................... 318/114; 310/317
[58] Field of Search .................................. 310/12, 13, 14, 310/15, 17, 20, 317, 26; 318/114

[56] References Cited

U.S. PATENT DOCUMENTS

| | | | |
|---|---|---|---|
| 4,811,835 | 3/1989 | Bullivant et al. | 318/114 X |
| 4,823,054 | 4/1989 | Millauer | 318/245 |
| 5,136,199 | 8/1992 | Kawai | 310/317 |
| 5,304,905 | 4/1994 | Iwasaki | 318/561 |
| 5,432,424 | 7/1995 | Takahashi | 318/696 |

*Primary Examiner*—Steven L. Stephan
*Assistant Examiner*—Judson H. Jones

[57] ABSTRACT

A drive device for a vibration actuator which stably drives the vibration actuator and prevents the occurrence of the cogging phenomenon. The vibration actuator provides a drive force by supplying a voltage to an electromechanical energy converting element which converts electrical energy into mechanical energy to produce mechanical vibratory motion. The drive device for the vibration actuator includes a voltage generating device to generate an alternating voltage which is impressed on the electromechanical energy converting element, and a voltage control device to control the alternating voltage of the voltage generating device such that the current supplied to the electromechanical energy converting element from the voltage generating device becomes constant. The voltage control device changes the output voltage value of the voltage generating device according to the excitation state of the electromechanical conversion element. The voltage control device controls the alternating voltage such that amplitude value, the effective value, or the average value of current supplied from the electromechanical energy converting element is constant. The drive device for the vibration actuator may also include a direct current power supply, a direct current-alternating current converter to convert the direct current voltage to an alternating voltage and to impress the alternating voltage on the electromechanical energy conversion element.

13 Claims, 16 Drawing Sheets

FIG. 9A LOGIC SIGNAL S
FIG. 9B CURRENT $I_1$
FIG. 9C CURRENT $I_2$
FIG. 9D VOLTAGE $V_c$
FIG. 9E VOLTAGE $V_o$

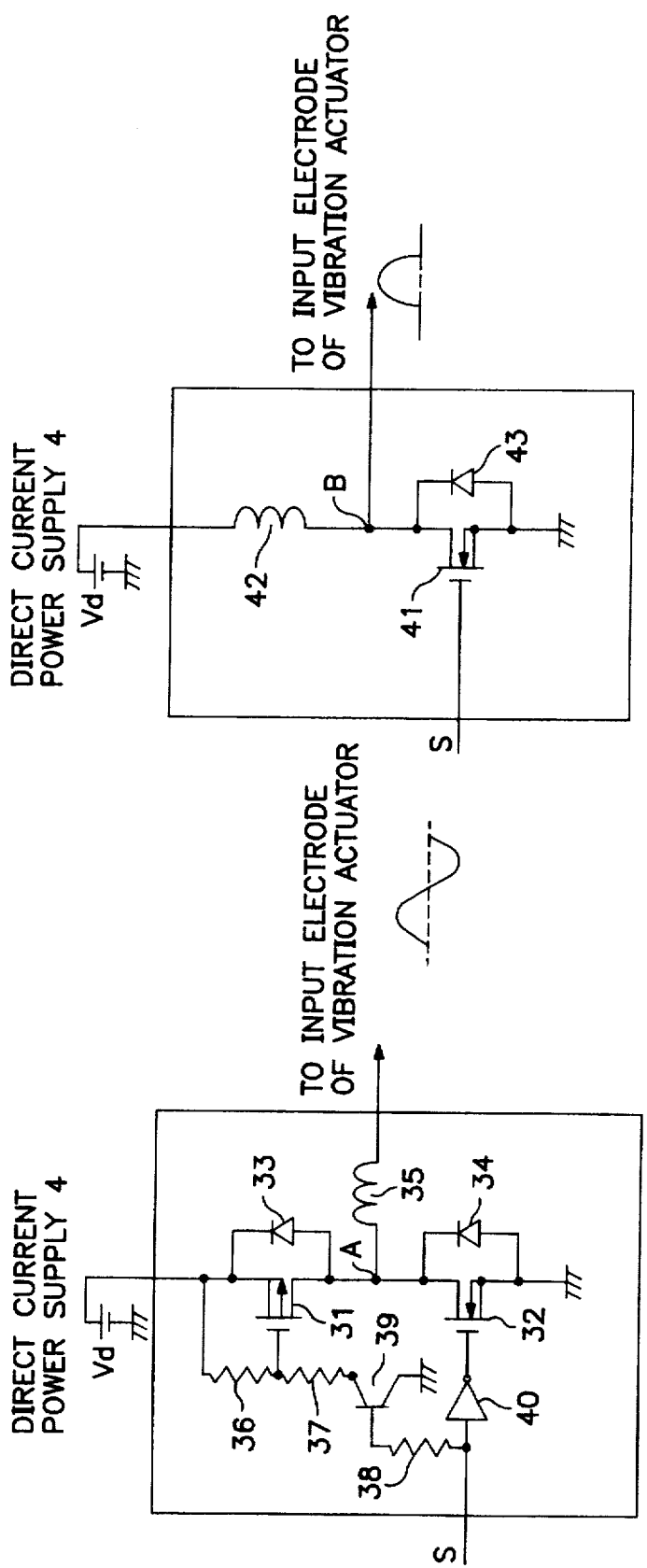

DRIVE DEVICE FOR A VIBRATION ACTUATOR WHICH PREVENTS THE COGGING PHENOMENON

CROSS REFERENCE TO RELATED APPLICATIONS

This application is based upon and claims priority from Japanese Patent Application Nos. 07-341094 filed Dec. 27, 1995 and 08-012022 filed Jan. 26, 1996.

DETAILED DESCRIPTION OF THE INVENTION

1. Field of the Invention

The present invention relates to a drive device for a vibration actuator which produces a drive force with mechanical vibration generated by an electromechanical energy converting element for converting electrical energy into mechanical energy, and, more particularly, the present invention relates to a drive device for a vibration actuator which stably drives the vibration actuator and eliminates the cogging phenomenon.

2. Description of the Related Art

Vibration actuators are known which generate a drive force with mechanical vibration generated by an electromechanical energy converting element which converts electrical energy into mechanical energy. FIG. 11A is a cross-sectional diagram showing the structure of a prior art vibration actuator 100. As shown in FIG. 11A, the vibration actuator 100 includes a rotor consisting of a mutually adhered rotating element 100-1 and sliding element 100-2, and a stator consisting of a mutually adhered elastic body 100-3 and vibration body 100-4. The rotor and stator are placed in compressive contact by a compression means (not shown in the drawing), and the rotor is driven by the stator.

FIG. 11B is a plan view of the vibration body 100-4. The vibration body 100-4 includes input electrodes 100-4a and 100-4b on which alternating voltages are impressed having a mutual phase difference of 90° or −90° at a frequency which is decided for the particular vibration actuator 100. The alternating voltages impressed on the input electrodes 100-4a and 100-4b form a travelling wave in the stator, and the rotor is frictionally driven by the travelling wave formed in the stator. The vibration body 100-4 also includes a ground connection electrode 100-4c to connect the vibration body 100-4 to common ground, and an electrode 100-4d to monitor a voltage of the vibration body 100-4, and which does not directly contribute to the vibration of the vibration body 100-4.

FIG. 11C is a circuit diagram of an equivalent circuit between the input electrode 100-4a or 100-4b of the vibration body 100-4 and the ground connection electrode 100-4d. The equivalent circuit is represented by a self capacitance $C_0$ and a series resonant LCR circuit connected in parallel with self capacitance $C_0$. The magnitude of the current which flows in the series resonant LCR circuit (hereinafter referred to as "motive current") is proportional to the drive speed (i.e., rotational speed) of the vibration actuator 100. The impedance of the series resonant LCR circuit increases and decreases by changing the frequency of the alternating voltage impressed on the electrode 100-4a, b. Accordingly, the magnitude of the motive current can be changed by variably controlling the frequency of the alternating voltage impressed on the electrodes 100-4a, b and, as a result, it is possible to control the drive speed of the vibration actuator 100.

FIG. 12 is a block diagram of a conventional drive device for driving the vibration actuator 100 shown in FIG. 11A. The drive device includes a control circuit 1 which controls the drive of the vibration actuator 100 with a signal having a voltage value $V_i$ input to a voltage controlled oscillator (VCO) 2. The VCO 2 outputs a sine wave signal $S_a$, having a frequency corresponding to the voltage value of the input signal $V_f$, to both an amplifier 3A and a phase shifter 4. The phase shifter 4 receives the sine wave signal from VCO 2 and forms a cosine wave signal $S_b$ whose phase is shifted by 90° or by −90° with respect to the input signal $S_a$, and outputs the phase-shifted signal to an amplifier 3B. The direction of the phase shift by the phase shifter 4 (i.e., 90° or −90°) is set according to drive direction (i.e., rotation direction) of the vibration actuator 100.

The amplifiers 3A, 3B respectively amplify the input signals $S_a$, $S_b$ by predetermined voltage amplification factors to produce alternating voltages $V_a$, $V_b$ having a greater amplitude than, and the same frequency as, the input signals $S_a$, $S_b$. The amplifiers 3A, 3B have output terminals respectively connected to the input electrodes 100-4a, 100-4b of the vibration body 100-4. Accordingly, the alternating voltages $V_a$, $V_b$ are impressed on the electrodes 100-4a, 100-4b, causing currents $I_a$, $I_b$ to flow through electrodes 100-4a, 100-4b. As a result of the alternating voltages $V_a$, $V_b$ impressed on the electrodes 100-4a, 100-4b, travelling waves are formed in the stator of the vibration actuator 100, and the rotor is driven frictionally by the mechanical vibration generated by the travelling wave.

FIG. 13A is a diagram showing the relationship between the vibration frequency f (referred to hereinbelow as the "drive frequency") and the drive quantity N (i.e., the rotational speed) of the vibration actuator 100 when an alternating voltage is impressed on the vibration actuator 100. As shown in FIG. 13A, the drive frequency f is "scanned" from a beginning high frequency ($f_0$) toward a low frequency ($f_5$) and then from the low frequency ($f_5$) toward the high frequency ($f_5$) to illustrate the change in drive quantity as the drive frequency f changes.

As shown in FIG. 13A, as the drive frequency f decreases from the high frequency $f_0$, the vibration actuator 100 is not driven in an interval in the high frequency region in which the drive frequency exceeds $f_1$ (point a–point b). The vibration actuator 100 starts to be driven when the drive frequency reaches $f_1$ (point b). As the drive frequency f decreases from $f_1$, the drive quantity N increases accompanying the decrease in the drive frequency f (point c, point d), and exhibits a maximum drive quantity N at a drive frequency $f_4$ (point e). When the drive frequency f is decreased further from the drive frequency $f_4$, the drive quantity N suddenly diminishes, and the drive of the vibration actuator 100 stops. The vibration actuator 100 remains stopped as the drive frequency f is decreased from $f_4$ to $f_5$. The sudden decrease in and stopping of the drive quantity N seen at point e in FIG. 13A is generally termed the "cogging phenomenon".

When the drive frequency f is then increased from $f_5$ toward a higher frequency, the vibration actuator 100 is not driven in the drive frequency region $f_5$–$f_2$ (point g–point h), and then suddenly begins to be driven when the drive frequency reaches $f_2$. The frequency $f_2$ at which the vibration actuator begins to be driven when the drive frequency is increased from $f_5$ is higher than the drive frequency $f_4$ at which the cogging phenomenon occurs during the decrease in drive frequency. At this time (point c), the drive quantity N is about the same as the drive quantity N measured when the drive frequency changes from the high frequency side to the low frequency side of the drive frequency range. As the drive frequency f is further increased beyond $f_2$, the drive of the vibration actuator 100 stops when the drive frequency reaches $f_1$. Accordingly, when the drive frequency is increased from $f_2$ to $f_1$, the locus which the drive quantity N exhibits is about equal to the locus exhibited when the drive frequency f is decreased from $f_1$ to $f_2$.

FIG. 13B is a diagram showing the changes of the current $I_a$ flowing in the input electrode 100-4a of the vibration body 100-4 when the vibration actuator 100 is driven under the conditions as shown in FIG. 13A. The magnitude of the current $I_a$ is the magnitude of the amplitude of the current flowing in the input electrode 100-4a. However, FIG. 13B shows the change of the effective value of the current $I_a$, instead of showing the change in the magnitude of the amplitude of the current $I_a$. The qualitative features of the effective value of the current $I_a$ are about the same as the magnitude of the current $I_a$. Moreover, the current $I_b$ flowing in the input electrode 100-4b exhibits values and changes which are about the same as those exhibited by the current $I_a$. Accordingly, illustration of the current $I_b$ is omitted.

As shown in FIG. 13B, the current $I_a$ gradually increases accompanying the decrease of the drive frequency from $f_0$ to $f_4$ (point a'–point d'). When the drive frequency f becomes $f_4$, the current $I_a$ reaches its maximum value, in a manner similar to the drive quantity N. The current $I_a$ changes in this manner because the impedance characteristics of the vibration body 100-4 change in dependence on the drive frequency f. Further, the current $I_a$ depends on the amplification of the motive current to the vibration body 100-4. When the drive frequency decreases further from $f_4$, the current $I_a$ suddenly decreases at about the same time as the drive of the vibration actuator 100 stops. After the sudden decrease in current $I_a$ as the drive frequency decreases further from $f_4$ (point e'), the current $I_a$ then decreases slightly until the drive frequency reaches $f_5$ (point g'). It is noted that the changes exhibited by the current $I_a$ are dependent on the increase of the motive current flowing to the vibration body 100-4. Further, the impedance characteristics of the vibration body 100-4 change depending on the drive frequency f.

As the drive frequency f changes from the low frequency $f_5$ to the high frequency side of the drive frequency range, when the drive frequency increases from $f_4$ to $f_2$, the current $I_a$ exhibits a value which is smaller than that exhibited when the drive frequency is decreased from the high frequency side to the low frequency side of the drive frequency range. The vibration actuator 100 starts again when the drive frequency reaches $f_2$, and the current $I_a$ suddenly increases (point c'). Further, in the frequency range from $f_2$ to $f_0$, the current $I_a$ monotonically decreases, exhibiting about the same locus as when the drive frequency f changes from the high frequency side to the low frequency side of the drive frequency range.

Thus, the vibration actuator 100 exhibits the characteristics of the cogging phenomenon in the above-described manner. The cogging phenomenon causes problems to occur when, for example, the drive frequency f is reduced to drive the vibration actuator 100 at a higher speed, and the vibration actuator suddenly stops.

Moreover, once the cogging phenomenon occurs, the drive quantity N exhibits hysteresis characteristics with respect to the drive frequency f. Accordingly, in order to restart the vibration actuator 100, it is necessary to control the drive frequency f to obtain a desired drive speed by momentarily increasing the drive frequency f to a frequency region higher than $f_2$, and, after the vibration actuator 100 is restarted, it is necessary to again reduce the drive frequency f to obtain the desired drive quantity N. However, because of the necessity of controlling the drive frequency f to increase and decrease to obtain the desired drive quantity N, the control required to restart the vibration actuator 100 is very complicated.

Furthermore, attempts to avoid the cogging phenomenon have been proposed by fixing a drive frequency $f_3$ higher by a predetermined amount than the frequency $f_4$ at which the cogging phenomenon occurs, and restricting the drive frequencies of the vibration actuator 100 to the range $f_1$–$f_3$. However, the frequency $f_4$ at which the cogging phenomenon occurs changes greatly due to temperature and the like. Therefore, it is difficult to specify the lower limit $f_3$ of the drive frequency f, and the cogging phenomenon is not completely avoided.

Thus, the prior art presents the problem of providing a drive device for a vibration actuator which drives the vibration actuator stably and which prevents the occurrence of the cogging phenomenon.

Another prior art drive device for driving the vibration actuator of FIG. 11A is shown in FIG. 14. The drive device shown in FIG. 14 controls the drive of the vibration actuator 100 in a manner similar to the drive device shown in FIG. 12, wherein like elements are referred to by the same reference numerals. A detailed description of these like elements is omitted.

The control circuit 1 and the VCO 2 operate in the same manner as described with respect to FIG. 12. The output of the VCO 2 is a signal $S_a$ having a frequency corresponding to the voltage value of the input signal $V_f$, and the output of the VCO 2 is connected to a direct current-alternating current (DC-AC) converter 3A and a phase shifter 5.

The phase shifter 5 generates a logic signal $S_b$ whose phase is shifted by 90° or by –90° with respect to the input signal $S_a$, and outputs the phase shifted signal $S_b$ to a DC-AC converter 3B. The direction of the phase shift produced by the phase shifter 5 (i.e., 90° or –90°) is set according to the drive direction (direction of rotation) of the vibration actuator 100.

The DC-AC converters 3A, 3B convert the input signals $S_a$, $S_b$, respectively, to alternating voltages of the same frequency according to a voltage supplied from a direct current power supply 4. The alternating voltages generated by the DC-AC converters 3A, 3B are impressed on the input electrodes 100-4a, 100-4b, respectively, of the vibration body 100-4. Travelling waves are formed in the stator of the vibration actuator 100 by the voltages impressed on the input electrodes 100-4a, 100-4b to drive the rotor frictionally.

Two examples of the DC-AC converters 3A, 3B of FIG. 14 are shown in FIGS. 15A and 15B. It is noted that the DC-AC converters 3A and 3B shown in FIG. 14 differ only in that the input logic signals $S_a$, $S_b$, as well as the alternating voltages which are output, have phase differences. Further, the DC-AC converters 3A, 3B have the same circuit construction, operation, and the like. Therefore, only the DC-AC converter 3A is described.

FIG. 15A is a circuit diagram of a first example of a prior art DC-AC converter. The DC-AC converter shown in FIG. 15A includes two switching elements 31 and 32 connected by a respective one of their terminals at a junction point A. The terminal of switching element 31 which is not connected to switching element 32 is connected to the direct current power supply 4. Further, the terminal of the switching element 32 not connected to switching element 31 is grounded. Diodes 33 and 34 are connected in parallel with the switching elements 31 and 32, respectively. An inductive element 35 is connected by one terminal to the junction point A, and the other terminal of inductive element 35 is connected to an input electrode 100-4a or 100-4b of the vibration body 100-4.

The switching element 31 is in the ON state (closed) when the logic signal S input to the DC-AC converter is at a logic level "H", and is in the OFF state (open) when the logic signal S input to the DC-AC converter is at a logic level "L". The logic signal S corresponds to the logic signals $S_a$, $S_b$ shown in FIG. 14. The switching element 32 receives the input signal S through an inverter 40, and, conversely to the switching element 31, the switching element 32 is in the OFF state when the logic signal S is at a logic level "H", and is in the ON state when the logic signal S is at a logic level "L".

In operation of the DC-AC converter shown in FIG. 15A, when the voltage of a direct current power supply 4 connected to the switching element 31 is Vd, and the logic level of the logic signal S is "H", the voltage at the junction point A is the voltage Vd. When the logic level of the logic signal S is "L", the voltage at the junction point A is the ground voltage. Accordingly, the voltage at the point A becomes a pulse voltage with a frequency equal to that of the logic signal S. When such a pulse voltage is present at the junction point A, an electrical resonant vibration is generated as a result of the inductance of the inductive element 35 and the static capacity of the vibration body 100, causing a sine wave alternating voltage to be impressed on the input electrodes 100-4a, 100-4b of the vibration body 100-4.

FIG. 15B is a circuit diagram of a second example of a prior art DC-AC converter. The DC-AC converter shown in FIG. 15B includes a switching element 41 and an inductive element 42 having respective terminals which are connected at a junction point B. Further, the terminal of inductive element 42 which is not connected to junction point B is connected to the direct current power supply 4, and the terminal of the switching element 41 not connected to junction point B is grounded. A diode 43 is connected in parallel with the switching element 41. The diode 43 has the function of preventing the output voltage from oscillating to a negative voltage. Moreover, the junction point B is connected to an input electrode 100-4a or 100-4b of the vibration body 100-4.

The switching element 41 is placed in the ON state when the logic level of the logic signal S is "H", and is placed in the OFF state when the logic level of the logic signal S is "L". In a manner similar to that described for the DC-AC converter shown in FIG. 15A, when the voltage of the direct current power supply 4 is Vd, and when the switching element 41 is in the ON state (i.e., the logic level of the logic signal S is "H"), the voltage Vd is impressed on the inductive element 42. As a result, electrical energy is stored in the inductive element 42 in accordance with the time for which the voltage Vd is impressed.

When the switching element 41 is placed in the OFF state, the electrical energy stored in the inductive element 42 contributes to an electrical resonant vibration generated by the inductive element 42 and the vibration body 100-4, and, as a result, an alternating voltage sine wave with the negative voltage portion clipped is impressed on the input electrode 100-4a or 100-4b.

FIG. 16A is a diagram showing the relationship between the frequency f (referred to hereinafter as the "drive frequency") of the alternating voltage output from the DC-AC converters 3A and 3B, and the drive quantity N (i.e., the rotational speed) of the vibration actuator 100 when an alternating voltage is impressed on the vibration actuator 100. The drive frequency f is "scanned" from a beginning high frequency ($f_0$) to a low frequency ($f_5$) and, is scanned from the low frequency to a high frequency.

As shown in FIG. 16A, as the drive frequency f decreases from $f_0$, the vibration actuator 100 is not driven in a range in the high frequency region in which the drive frequency exceeds $f_1$ (point a–point b), and starts to be driven when the drive frequency f becomes $f_1$. As the drive frequency f decreases from $f_1$, the drive quantity N increases accompanying the decrease of the drive frequency f (point c, point d), and exhibits a maximum at a drive frequency $f_4$ (point e). When the drive frequency f decreases further beyond $f_4$, the drive quantity N suddenly diminishes and the drive of the vibration actuator 100 stops. This sudden decrease and stop of the drive quantity N is generally termed the "cogging phenomenon". The vibration actuator 100 remains stopped when the drive frequency falls to $f_5$.

When the drive frequency f changes from the low frequency $f_5$ toward a higher frequency, the vibration actuator 100 is not driven in the drive frequency range $f_5$–$f_2$ (point g, point h), and suddenly begins to be driven when the drive frequency reaches $f_2$, a frequency higher than the drive frequency $f_4$ at which the cogging phenomenon occurs. At this time (point c), the drive quantity N is about the same as was exhibited when the drive frequency f changed from the high frequency side to the low frequency side of the drive frequency range. When the drive frequency is increased from $f_2$ to $f_1$, the locus which the drive quantity N exhibits is about equal to the locus exhibited when the drive frequency f is decreased from $f_1$ to $f_2$. The drive of the vibration actuator 100 then stops when the drive frequency reaches $f_1$.

FIG. 16B shows the change of the average current $I_{d(ave)}$ which is supplied from the direct current power supply 4 to the input electrode 100-4a of the vibration body 100-4 when the vibration actuator 100 is driven under the conditions shown in FIG. 16A.

The current $I_{d(ave)}$ gradually increases (point a'–point d') accompanying the decrease in the drive frequency from $f_0$ toward $f_4$, and when the drive frequency reaches $f_4$, the current $I_{d(ave)}$ is a maximum value (point e'), similar to the drive quantity N. When the drive frequency decreases further from $f_4$, the current $I_{d(ave)}$ suddenly decreases at about the same time as the drive of the vibration actuator stops. Further, as the drive frequency decreases below $f_4$, the current $I_{d(ave)}$ decreases slightly until the drive frequency reaches $f_5$ (point g'). It is noted that the changes that the current $I_{d(ave)}$ exhibits depend on the increase in the motive current flowing to the vibration body 100-4. The impedance characteristics of the vibration body 100-4 change depending on the drive frequency f.

When the drive frequency changes from the low frequency $f_5$ to the high frequency side of the drive frequency range, the current $I_{d(ave)}$ only increases slightly (point g', point h') up to the frequency $f_2$ at which the vibration actuator 100 restarts. As a result, in the drive frequency range from $f_4$ to $f_2$, the current $I_{d(ave)}$ exhibits a value which is smaller than that exhibited when the drive frequency f changes from the high frequency side to the low frequency side of the drive frequency range. The vibration actuator 100 is again started when the drive frequency reaches $f_2$, and the current $I_{d(ave)}$ suddenly increases (point c'). Further, in the drive frequency range $f_2$ to $f_0$, the current $I_{d(ave)}$ monotonically decreases, exhibiting about the same locus as when the drive frequency changes from the high frequency side to the low frequency side of the drive frequency range.

In the above-described manner, the prior art vibration actuator described with reference to FIGS. 14–16 exhibits the cogging phenomenon wherein the vibration actuator suddenly stops, when, for example, the drive frequency is reduced to cause driving of the vibration actuator at a higher speed. Further, the same problems as described above with respect to the prior art vibration actuator shown in FIGS. 12 and 13 occur with the vibration actuator shown in FIGS. 14–16.

SUMMARY OF THE INVENTION

It is an object of the present invention to provide a drive device for a vibration actuator which stably drives the vibration actuator while preventing the occurrence of the cogging phenomenon.

It is another object of the present invention to provide a drive device for a vibration actuator which prevents the cogging phenomenon and hysteresis in the drive characteristics of the vibration actuator by controlling the values of the alternating voltages which are impressed on respective electrodes which drive a vibration body such that the effective values or amplitude values of the currents flowing in the vibration body become about constant and do not depend on the vibration frequency.

It is another object of the present invention to provide drive device for a vibration actuator which prevents the cogging phenomenon and hysteresis in the drive characteristics of the vibration actuator with a variable voltage power supply whose output voltage value can be varied by controlling the output voltage such that the average value of the current output from the variable voltage power supply is constant, and does not depend on the drive frequency of the vibration actuator.

Additional objects and advantages of the invention will be set forth in part in the description which follows, and, in part, will be obvious from the description, or may be learned by practice of the invention.

Objects and advantages of the present invention are achieved in accordance with embodiments of the present invention with a drive device for a vibration actuator which produces a drive force with mechanical vibratory motion of an electromechanical energy converting element which converts electrical energy into mechanical energy. The drive device for the vibration actuator includes a voltage generating device to generate an alternating voltage which is impressed on the electromechanical energy converting element, and a voltage control device to control the alternating voltage of the voltage generating device such that the amplitude value or the effective value of the current supplied to the electromechanical energy converting element from the voltage generating device becomes constant.

In accordance with embodiments of the present invention, the voltage generating device includes an oscillating circuit which outputs an alternating voltage, and an amplifier circuit which amplifies the alternating voltage output by the oscillating circuit. The voltage control device includes a current detection circuit to detect the current supplied to the electromechanical energy converting element from the voltage generating device, and an amplification factor control circuit to control the amplification factor of the amplifier circuit, based on the detection result of the current detection circuit.

Objects and advantages of the present invention are achieved in accordance with embodiments of the present invention with a drive device for a vibration actuator which produces drive force using the mechanical vibratory motion of an electromechanical energy converting element which converts electrical energy into mechanical energy. The drive device includes a direct current power supply, a voltage generating circuit to receive a supply of electric power from the direct current power supply, and a direct current-alternating current converter to impress on the electromechanical converting element the direct current voltage supplied from the direct current power supply, converted to an alternating voltage. The voltage generating circuit changes its output voltage value according to the excitation state of the electromechanical energy converting element, such that the average current supplied from the direct current power supply in one cycle of the alternating voltage is constant in each period.

In accordance with embodiments of the present invention, the drive device of the vibration actuator includes a direct current power supply, a voltage generating circuit to receive a supply of electric power from the direct current power supply, an oscillator to output a logic signal of a predetermined frequency, a phase shifter to shift the phase of the logic signal output by the oscillator by a predetermined amount, a direct current-alternating current converter to impress on the electromechanical energy converting element an alternating voltage converted from the direct current voltage supplied from the direct current power supply, based on the logic signal from the phase shifter or based on the logic signal from the oscillator. The voltage generating circuit changes its output voltage value according to the excitation state of the electromechanical energy conversion element such that the average current supplied from the direct current power supply in one cycle of the alternating voltage is constant in each period.

In accordance with embodiments of the present invention, the voltage generating circuit of the drive device for the vibration actuator includes an inductive element to store electrical energy by receiving a supply of current from the direct current power supply, a connection unit to connect the direct current power supply to the inductive element, and a capacitor which is charged by electrical energy stored by the inductive element, and which outputs a voltage to the direct current-alternating current converter. The connection unit limits the connection time of the direct current power supply with the inductive element, and makes constant the average current supplied from the direct current power supply to the inductive element in one cycle of the alternating voltage in each period.

In accordance with embodiments of the present invention, the drive device of the vibration actuator includes a direct current power supply, and a direct current-alternating current converter which impresses on the electromechanical energy converting element an alternating voltage converted from the direct current voltage supplied from the direct current power supply, the direct current-alternating current converter changes its output voltage value according to the excitation state of the electromechanical energy converting element, such that the average current supplied from the direct current power supply in one cycle of the alternating voltage is constant in each period.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIGS. 15A and 15B are diagrams showing examples of DC/AC converters used in the drive device of a prior art vibration actuator.

DETAILED DESCRIPTION OF THE PREFERRED EMBODIMENTS

Figure 1:
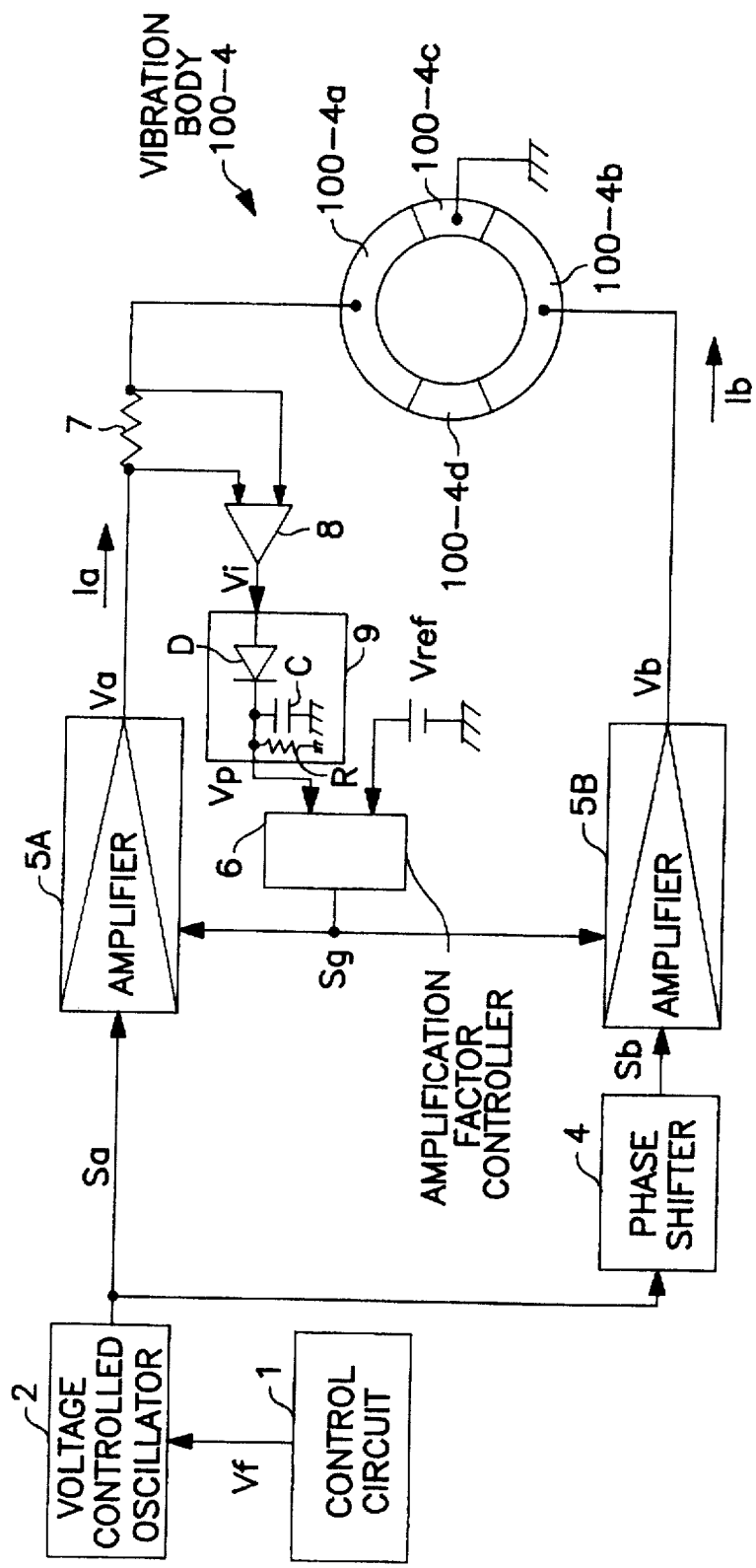
FIG. 1 is a block diagram of a drive device for a vibration actuator in accordance with embodiments of the present invention.

Reference will now be made in detail to the preferred embodiments of the present invention, examples of which are illustrated in the accompanying drawings wherein like reference numerals refer to the same or similar elements throughout.

In accordance with embodiments of the present invention, in the description which follows the term "vibration actuator" refers generally to a device which uses vibratory motion to produce a drive force. An ultrasonic motor is an example of a vibration actuator. Furthermore, the term "vibration body" is used generically to refer to piezoelectric bodies, electrostrictive bodies, and the like, which are used as electromechanical energy converting elements.

FIG. 1 is a block diagram showing a drive device for a vibration actuator in accordance with embodiments of the present invention. The embodiment of the invention shown in FIG. 1 includes a control circuit 1, a VCO 2 and a phase shifter 4 which operate in a manner similar to the prior art. Accordingly, a detailed description of these elements will not be repeated here.

As shown in FIG. 1, amplifiers 5A and 5B receive input signals $S_a$, $S_b$ from the VCO 2 and the phase shifter 4, respectively, and amplify the input signals $S_a$, $S_b$. The amplifiers 5A, 5B cause their amplification factor G to change based on a control signal $S_g$ from an amplification factor controller 6, which is described in detail hereinbelow. The amplification factor G is the voltage ratio of the output signal $V_a$ or $V_b$ to the input signal $S_a$ or $S_b$ ($V_a/S_a$, or $V_b/S_b$).

A resistor 7 is inserted between the amplifier 5A and the input electrode 100-4a of the vibration body 100-4 such that a voltage proportional to the current $I_a$ input to the electrode 100-4a can be detected. The two terminals of the resistor 7 are respectively connected to the input terminals of a differential amplifier 8, and the differential amplifier 8 outputs a voltage waveform $V_i$ proportional to the voltage difference between the two terminals of the resistor 7. Moreover, the voltage $V_i$ output from the differential amplifier 8 is input to an amplitude detector 9.

The amplitude detector 9 is a peak detector circuit which detects the amplitude of the voltage waveform $V_i$ which is input to the amplitude detector 9, and outputs a signal $V_p$ corresponding to the detected amplitude value. The output terminal of the amplitude detector 9 is connected to an amplification factor controller 6 which receives the output signal $V_p$ from the amplitude detector 9, and a constant voltage $V_{ref}$ at its other input terminal. The amplification factor controller 6 compares the voltage waveform $V_i$ with the voltage $V_{ref}$ and, based on the result of the comparison, outputs to the amplifiers 5A and 5B a suitable control signal $S_p$ which regulates the amplification factor G.

In operation of the drive device shown in FIG. 1, when an alternating voltage $V_a$ is impressed on the vibration body 100-4 and a current $I_a$ flows, a voltage difference which is proportional to the current $I_a$ arises between the two terminals of the resistor 7. The differential amplifier 8 detects the voltage difference between the terminals of the resistor 7, and outputs to the amplitude detector 9 a voltage $V_i$ which is proportional to the detected voltage difference. The voltage $V_i$ is an alternating voltage which changes proportionally to the current $I_a$, and the increase and decrease of the current $I_a$ is represented by the amplitude value or the effective value of the alternating voltage.

The amplitude detector 9 detects the amplitude value of the alternating voltage $V_i$, and outputs to the amplification factor controller 6 a voltage signal $V_p$ proportional to the detected amplitude. The amplification factor controller 6 compares the magnitude of the two input voltages, $V_p$ and $V_{ref}$. If $V_p > V_{ref}$ then the amplification factor controller 6 outputs a suitable control signal $S_g$ to reduce the amplification factor G of the amplifiers 5A and 5B. If $V_p < V_{ref}$ then the amplification factor controller 6 outputs a suitable control signal to increase the amplification factor G. Furthermore, if $V_p = V_{ref}$ then the amplification factor controller outputs a control signal $S_g$ which maintains the amplification factor G at the current value.

In accordance with the embodiment of the invention shown in FIG. 1, the value of the current $I_a$ supplied to the vibration body 100-4 from the amplifier 5A is controlled such that a constant current $I_a$ corresponding to the constant voltage $V_{ref}$ is supplied. Moreover, the amplifier 5B has its amplification factor G controlled by the output signal $S_g$ of the amplification factor controller 6, in a manner similar to the amplifier 5A, such that a constant current $I_b$ corresponding to the constant voltage $V_{ref}$ is supplied. Thus, in accordance with the embodiment of the invention shown in FIG. 1, the value of the current $I_b$ which is supplied to the vibration body 100-4 from the amplifier 5B is controlled to be the same as the value of the current $I_a$ supplied from the amplifier 5A. Furthermore, the constant voltage $V_{ref}$ and the currents $I_a$ and $I_b$ are set to sufficient values for the vibration actuator 100 to be driven in the desired drive quantity range.

Figure 2:
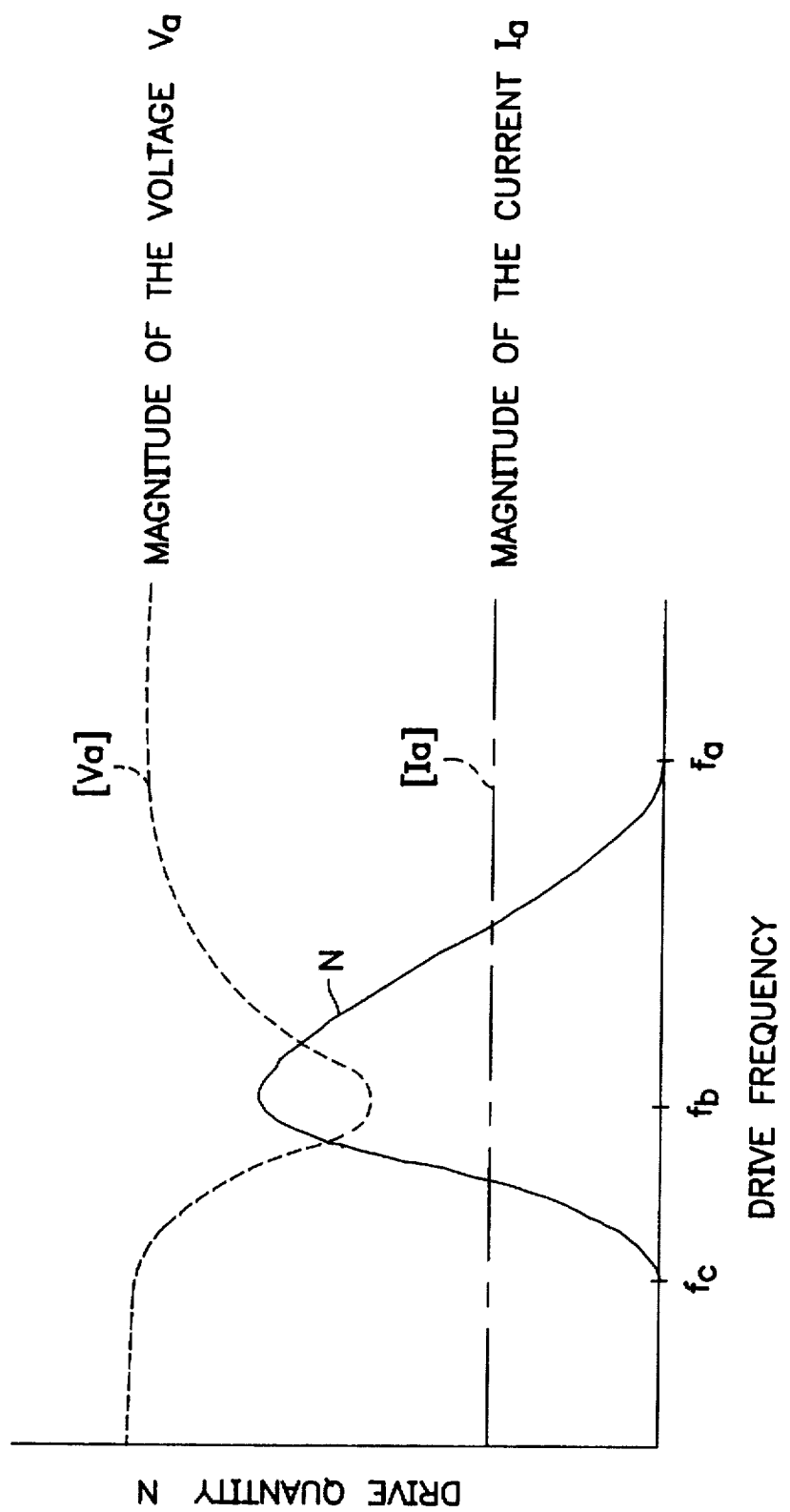
FIG. 2 is a diagram showing the drive characteristics of a vibration actuator when the vibration actuator is driven in accordance with embodiments of the present invention.

FIG. 2 is a diagram showing the drive characteristics of the vibration actuator 100 when driven by the drive device shown in FIG. 1 in accordance with embodiments of the present invention. More particularly, FIG. 2 shows the relationship between the drive frequency f, the magnitude $|I_a|$ of the current flowing in the input electrode 100-4a, the magnitude $|V_a|$ of the alternating voltage impressed on the input electrode 100-4a, and the drive quantity N when the vibration actuator is driven using the drive device shown in FIG. 1. The drive frequency f shown in FIG. 2 is considered to be scanned initially from a high frequency side of the drive frequency range to a low frequency side, and then from the low frequency side to the high frequency side of the drive frequency range.

As shown in the FIG. 2, the magnitude of the current $|I_a|$ supplied to the input electrode 100-4a is normally maintained at a constant value, regardless of the value of the drive frequency f. However, the magnitude of the alternating voltage $|V_a|$ decreases as the drive frequency f is decreased to $f_b$, and the magnitude of the alternating voltage $|V_a|$ increases as the drive frequency f is decreased further to $f_c$. Moreover, the drive quantity N of the vibration actuator 100 becomes larger as the magnitude of the alternating voltage $|V_a|$ decreases, and the drive quantity N becomes smaller as the magnitude of the alternating voltage $|V_a|$ increases. The change of drive quantity N according to the magnitude of the alternating voltage $|V_a|$ is a manifestation of suitably controlling $|V_a|$, where $|I_a|$ is kept constant accompanying the change of the drive frequency f, with respect to the changing impedance characteristics of the vibration body 100-4 and the amplification factor controller 6, and the like, operating suitably.

When the drive frequency f of the vibration actuator 100 changes from the high frequency side to the low frequency side of the drive frequency range, starting at the drive frequency $f_a$, the drive quantity N gradually increases accompanying the reduction of the drive frequency f. The drive quantity N exhibits a maximum value at the drive frequency $f_b$, and then slowly decreases following the decrease of the drive frequency f, becoming zero at and below a drive frequency $f_c$.

It is noted that the hysteresis characteristics which occur when a vibration actuator is driven using the prior art drive device are not exhibited when using the drive device shown in FIG. 1. Moreover, the magnitude of the current $|I_b|$ and the magnitude of the alternating voltage $|V_b|$ exhibit characteristics which are similar to $|V_a|$ and $|I_a|$, respectively, and are omitted from FIG. 2.

Accordingly, when driving the vibration actuator 100 with the drive device shown in FIG. 1, the drive characteristics exhibit only a slow change, and the cogging phenomenon, during which the drive quantity suddenly decreases or stops, does not occur. Specifically, as shown in FIG. 2, the hysteresis in the drive characteristics of the vibration actuator 100 is eliminated. Therefore, in accordance with the embodiment of the invention shown in FIG. 1, even when the frequency characteristics of the vibration actuator 100 change when there are changes in the temperature and the like ambient environment, the drive characteristics are unaffected.

Further, in accordance with the embodiment of the invention shown in FIG. 1, data relating to the magnitude of the current $I_a$ flowing in the vibration body 100-4 is obtained from an amplitude detector 9 which determines the amplitude value $V_p$ of the voltage $V_i$ output from the differential amplifier 8. However, data relating to the magnitude of the current $I_a$ flowing in the vibration body 100-4 may be detected by other methods. For example, the effective value of the voltage $V_i$ may be found using an effective value detector.

In accordance with the embodiments of the present invention shown in FIGS. 1 and 2, and described in detail hereinabove, the control circuit 1, the VCO 2, the phase shifter 4, and the amplifiers 5A, 5B comprise a voltage generating device; and the resistor 7, the differential amplifier 8, the amplitude detector 9 and the amplification factor controller 6 comprise a voltage control device. The voltage control device controls the alternating voltage generated by the voltage generating device such that the amplitude value or the effective value of the current supplied to the electromechanical energy converting element from the voltage generating device becomes constant. Thus, it is possible to drive the vibration actuator without the cogging phenomenon occurring. Moreover, in accordance with the embodiments of the present invention described hereinabove, the drive characteristics of the vibration actuator do not exhibit hysteresis, and it is possible to easily control the drive state of the vibration actuator.

Figure 3:
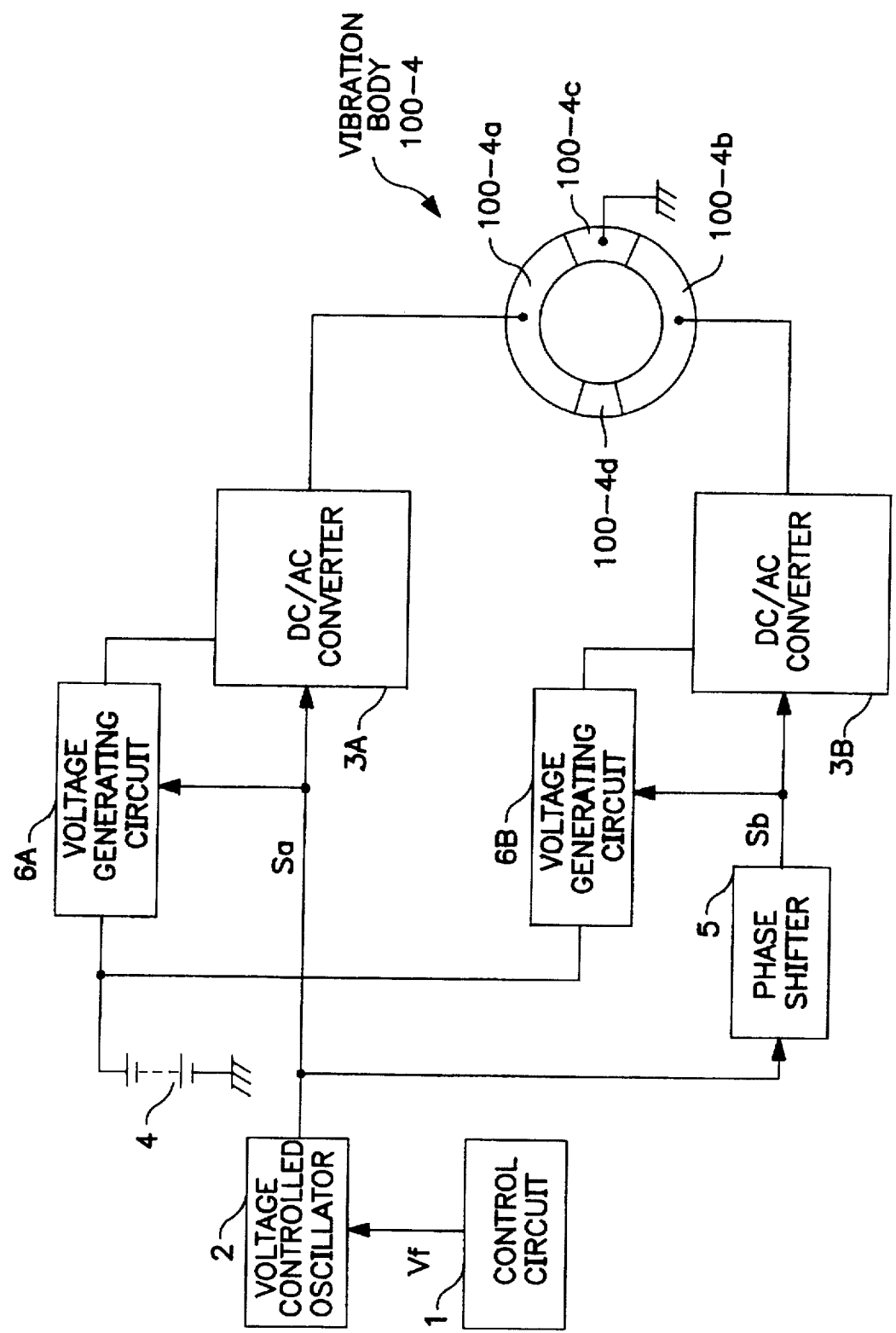
FIG. 3 is a block diagram of a drive device for a vibration actuator in accordance with embodiments of the present invention.

FIG. 3 is a block diagram of a drive device for a vibration actuator in accordance with another embodiment of the present invention. The embodiment of the invention shown in FIG. 3 is similar to the prior art drive device shown in FIG. 14, and a detailed description of the like elements is omitted.

Figure 14:
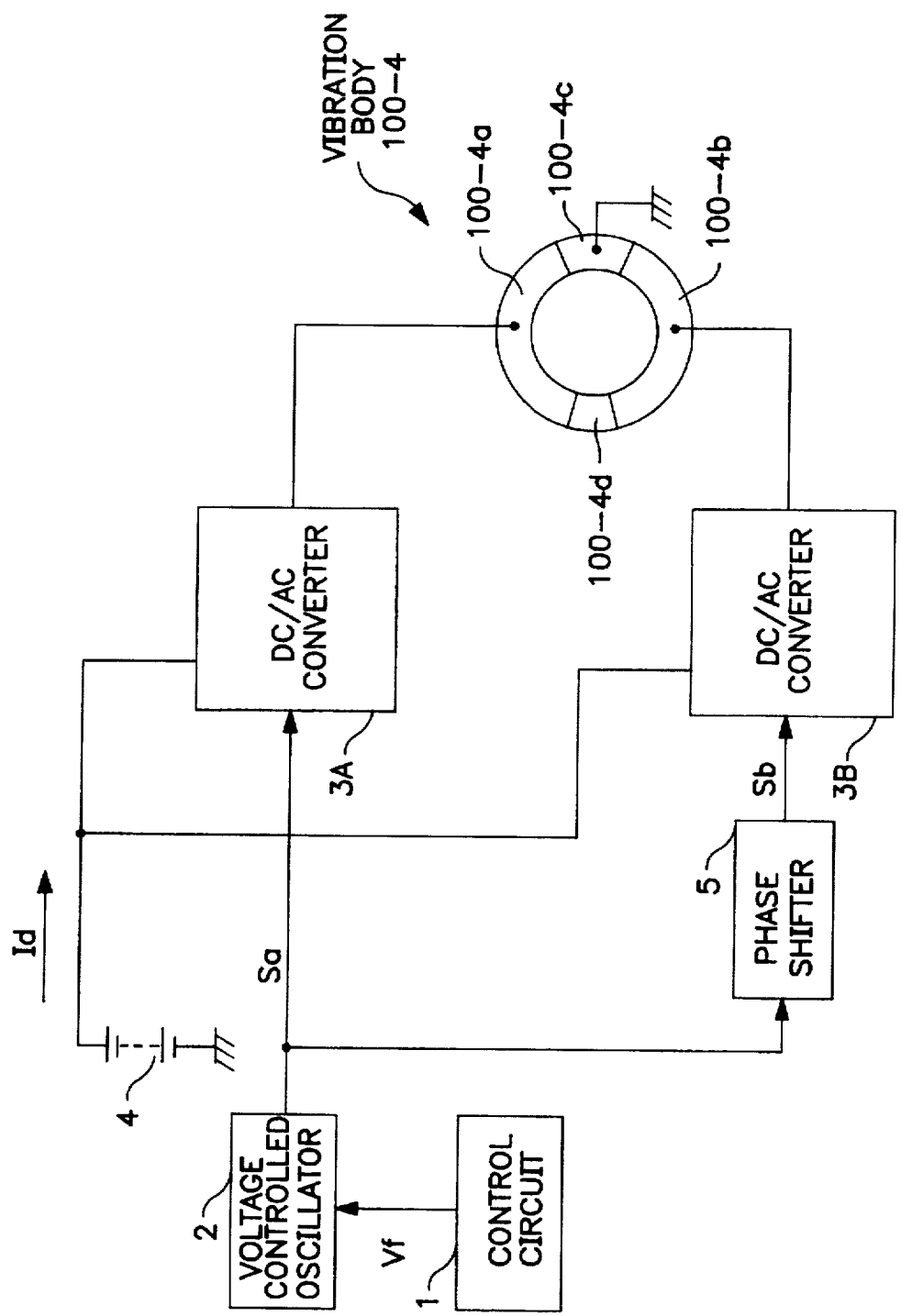
FIG. 14 is a block diagram of a prior art drive device for the vibration actuator shown in FIG. 11A.
Figure 16A:
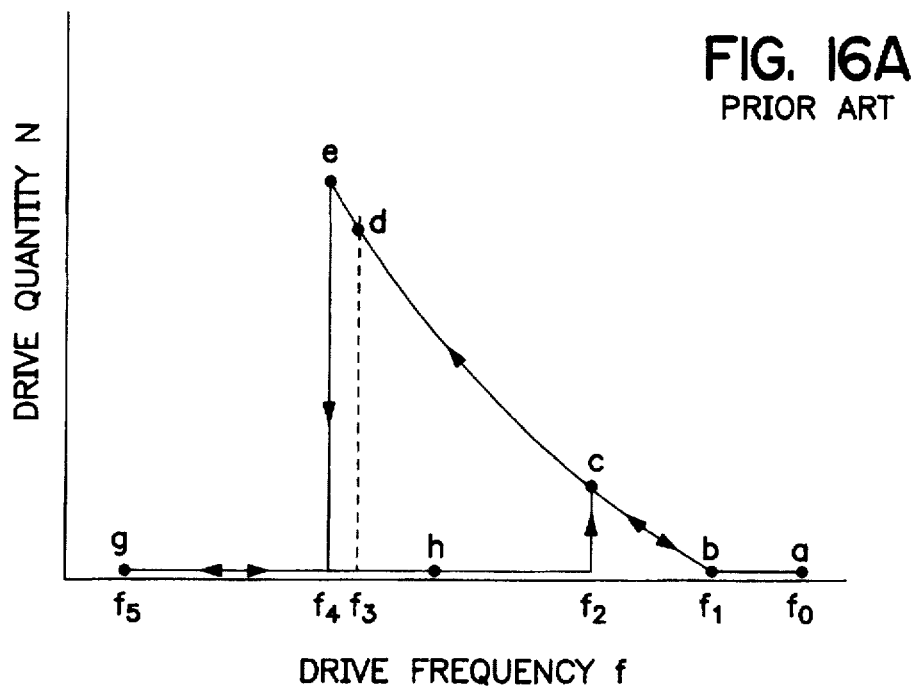
FIGS. 16A and 16B are diagrams showing the drive characteristics of a prior vibration actuator.
Figure 16B:
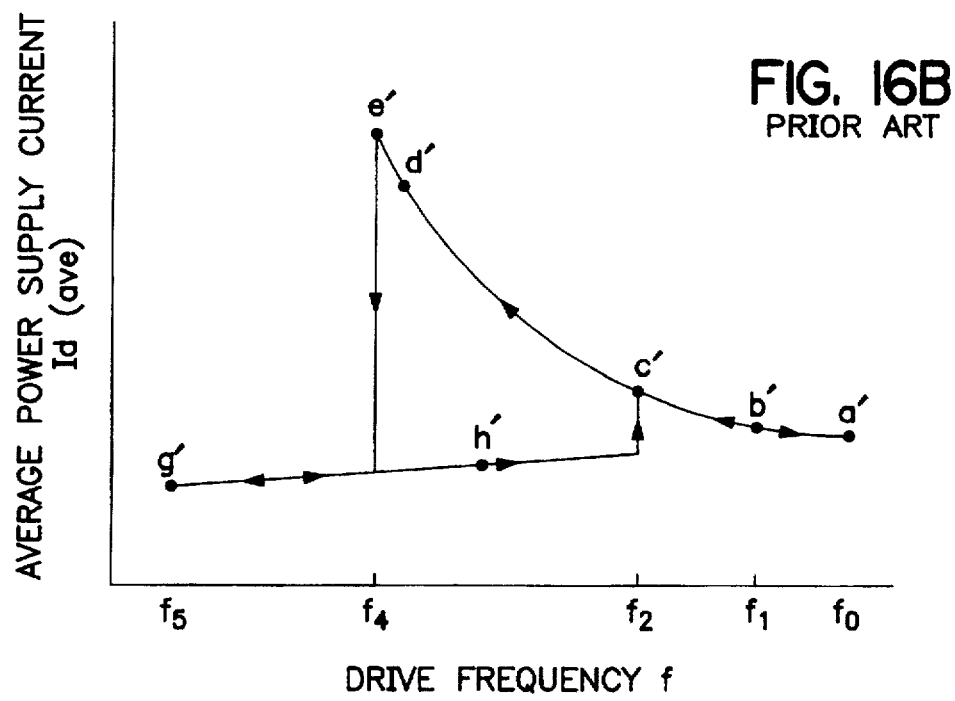

The control circuit 1, VCO 2, DC/AC converters 3A, 3B, phase shifter 5 and vibration body 100-4 operate in a manner similar to the like elements shown in FIG. 14. The drive device shown in FIG. 3 differs from the prior art drive device shown in FIG. 14 in that voltage generating circuits 6A, 6B are respectively inserted between the direct current power supply 4 and the DC-AC converters 3A, 3B. The logic signals $S_a$, $S_b$ are input into the voltage generating circuits 6A, 6B, respectively. Further, the DC-AC converters 3A, 3B output a magnitude of alternating voltage according to the magnitude of the input voltage, and the DC-AC converters shown in FIGS. 15A or 15B may be incorporated into the drive device of FIG. 3.

Figure 4:
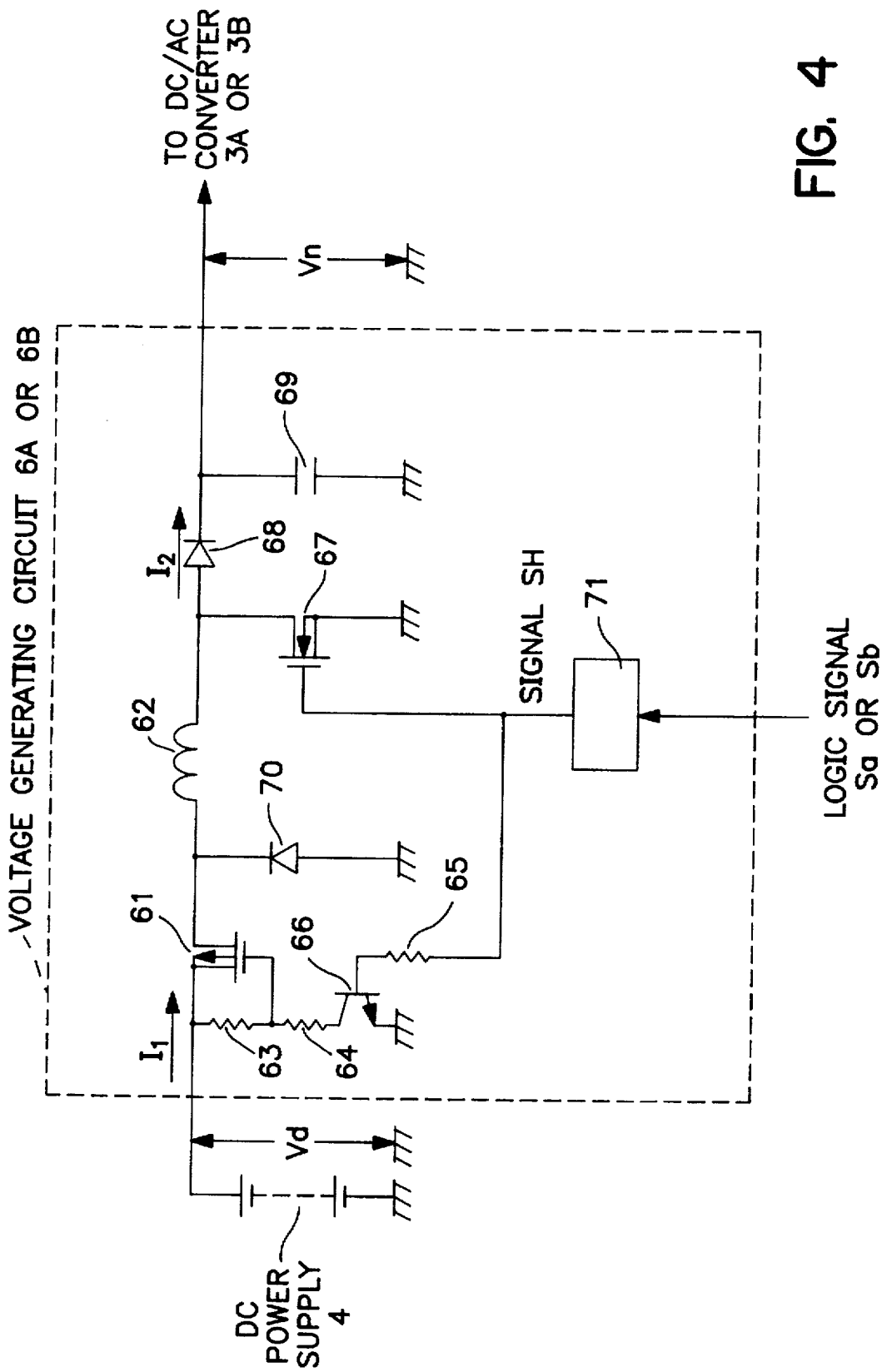
FIG. 4 is a circuit diagram of a voltage generating circuit in accordance with embodiments of the present invention.

FIG. 4 is a circuit diagram of the voltage generating circuits 6A and 6B in accordance with embodiments of the present invention. The voltage generating circuits 6A and 6B differ only in the phase of the respective logic signal $S_a$ and $S_b$ which are input thereto, and in the DC-AC converter 3A, 3B to which their output is connected. Otherwise, the voltage generating circuits 6A and 6B are the same.

As shown in FIG. 4, the voltage generating circuit 6A or 6B includes a switching element 61 between the direct current power supply 4, and an inductive element 62 and diode 70. The inductive element 62 has one terminal connected to the switching element 61 and the other terminal connected to a switching element 67 and to an anode of a diode 68. The terminal of the switching element 67 which is not connected to the inductive element 62 is grounded.

The logic signal $S_a$ or $S_b$ is input to the voltage generating circuit 6A or 6B via a one-shot circuit 71. The one-shot circuit 71 outputs for a constant time a signal $S_H$ of logic level "H" when a logic signal $S_a$ or $S_b$ is input, in synchronism with the logic level of the input signal $S_a$ or $S_b$ changing from "L" to "H". The switching element 61 is placed in the ON state when the logic level of the signal $S_H$ output from the one-shot circuit 71 is "H", and is placed in an OFF state by the operation of resistors 63, 64 and 65 together with a transistor 66 when the logic level of the signal $S_H$ is "L". When the switching element 61 is in the ON state, the voltage Vd of the direct current power supply 4 is impressed on one terminal of the inductive element 62, and when the switching element 61 is in the OFF state, the voltage Vd is cut off.

The switching element 67 is placed in the ON state when the signal $S_H$ from the one-shot circuit 71 has the logic level "H", thereby grounding the terminal of the inductive element 62 connected to switching element 67. When the switching element 67 is in the OFF state, the terminal of the inductive element 62 connected to switching element 67 is disconnected from ground.

The diode 68 has its cathode terminal connected to a capacitor 69 and to the DC-AC converter 3A or 3B as the output of the voltage generating circuit 6A or 6B.

FIGS. 5A–5E are graphs illustrating the operation of the voltage generating circuits 6A, 6B in accordance with embodiments of the present invention.

Figure 5:
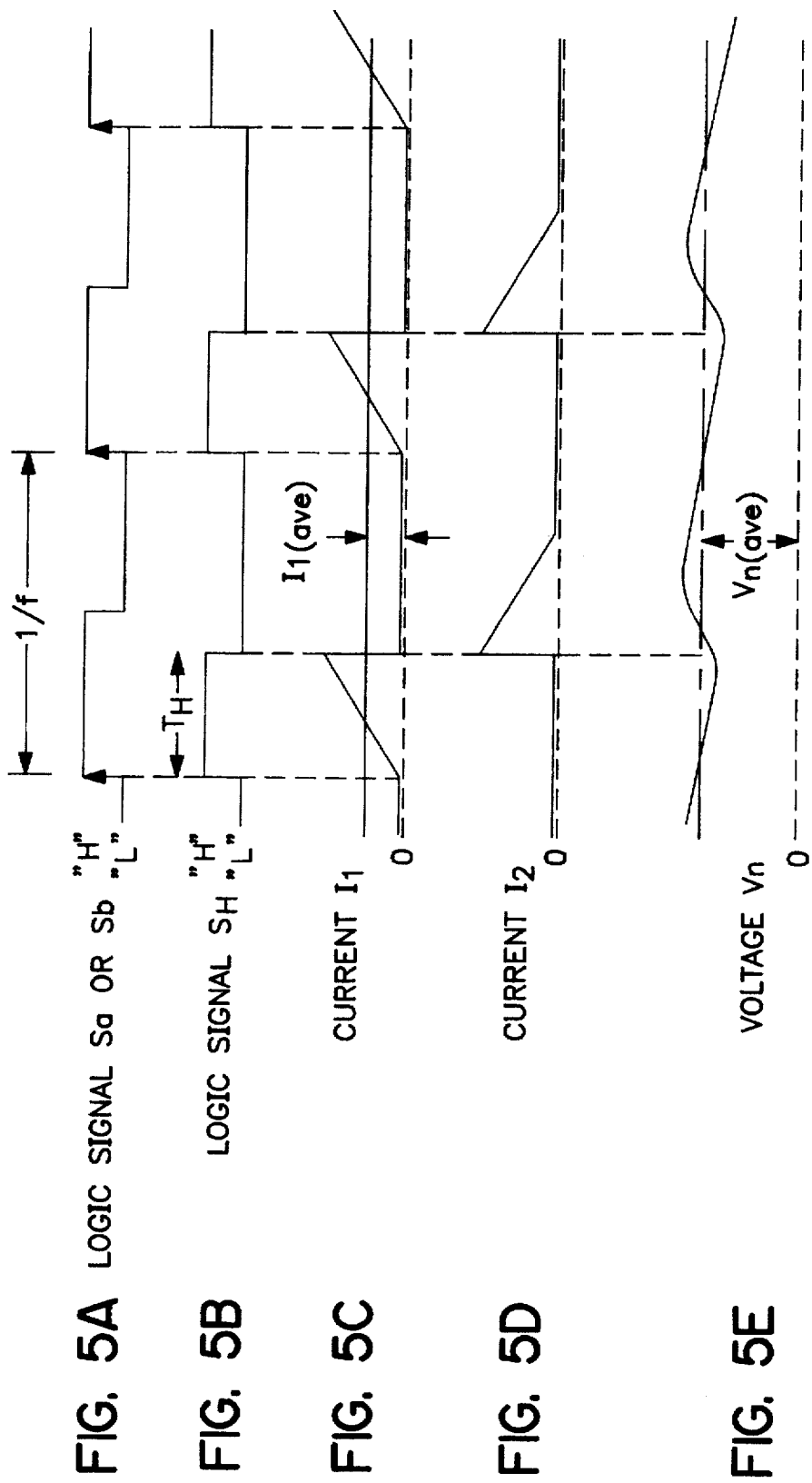
FIGS. 5A–5E are graphs showing the operation of the voltage generating circuits 6A, 6B shown in FIG. 3 in accordance with embodiments of the present invention.

FIG. 5A is a graph of the change of the logic signal $S_a$ or $S_b$. As shown in FIG. 5A, the logic signal $S_a$ or $S_b$ reverses its logic level at a frequency corresponding to the drive frequency f of the vibration actuator 100. Consequently, the period of the logic signal $S_a$ or $S_b$ is 1/f.

FIG. 5B is a graph of the output signal $S_H$ of the one-shot circuit 71. The one-shot circuit 71 outputs a positive logic pulse signal $S_H$ having a width $T_H$ from the instant that the logic level of the logic signal $S_a$ or $S_b$ changes from "L" to "H".

FIG. 5C is a graph of the current $I_1$ which flows in the inductive element 62 from the direct current power supply 4. When the signal $S_H$ is "H", the switching elements 61 and 67 are both in the ON state, the voltage Vd of the direct current power supply 4 is impressed on the inductive element 62, and the current $I_1$ flows in the inductive element 62. The current $I_1$, represented as a function of the time t, when the inductance value of the inductive element 62 is L, is given by equation (1) below.

$$I_1 = (V_d/L) \cdot t \tag{1}$$

As can be seen by equation (1), the current $I_1$ increases in proportion to the time t for which the voltage $V_d$ is impressed.

When the signal $S_H$ becomes "L", the switching elements 61, 67 are both in the OFF state, the connection between the direct current power supply 4 and the inductive element 62 is cut off, and the current $I_1$ does not flow. It is noted that the average value $I_{1(ave)}$ of the current $I_1$ depends only on the interval $T_H$ for which the signal $S_H$ is "H". Accordingly, if the interval $T_H$ becomes constant, unrelated to the drive frequency f, the average value $I_{1(ave)}$ of the current $I_1$ becomes constant, and the electrical energy which is supplied from the direct current power supply 4 to the voltage generating circuits 6A, 6B also becomes constant.

Furthermore, during the interval in which the signal $S_H$ has the logic level "H" the energy E stored in the inductive element 62 is given by equation (2) below.

$$E = \tfrac{1}{2} L (V_d/L \cdot T_{11})^2 \tag{2}$$

The energy E stored in the inductive element 62 stores a charge in the capacitor 69 resulting from a current $I_2$ flowing in the diode 68, the capacitor 69 and the diode 70. FIG. 5D is a graph of the current $I_2$. In particular, the capacitor 69 is charged, and a voltage $V_n$ appears across its terminals. FIG. 5E is a graph of the voltage $V_n$ stored in the capacitor 69.

The capacitor 69 is charged by the current $I_2$ and the charge stored by the capacitor 69 is consumed as electric power by the DC-AC converters 3A, 3B to impress an alternating voltage on the vibration body 100-4. For this purpose, the voltage $V_n$ (FIG. 5E) contains a ripple portion. Moreover, the average $V_{n(ave)}$ of the voltage $V_n$ changes in dependence on the drive frequency f. Further, since the impedance characteristics of the vibration body 100-4 rise and fall according to the drive frequency, the amount of current consumed by the DC-AC converters 3A, 3B changes. Furthermore, the pulse width output by the one-shot circuit 71 is set to a width greater than the voltage value with which it is possible to drive the vibration actuator 100.

Figure 6:
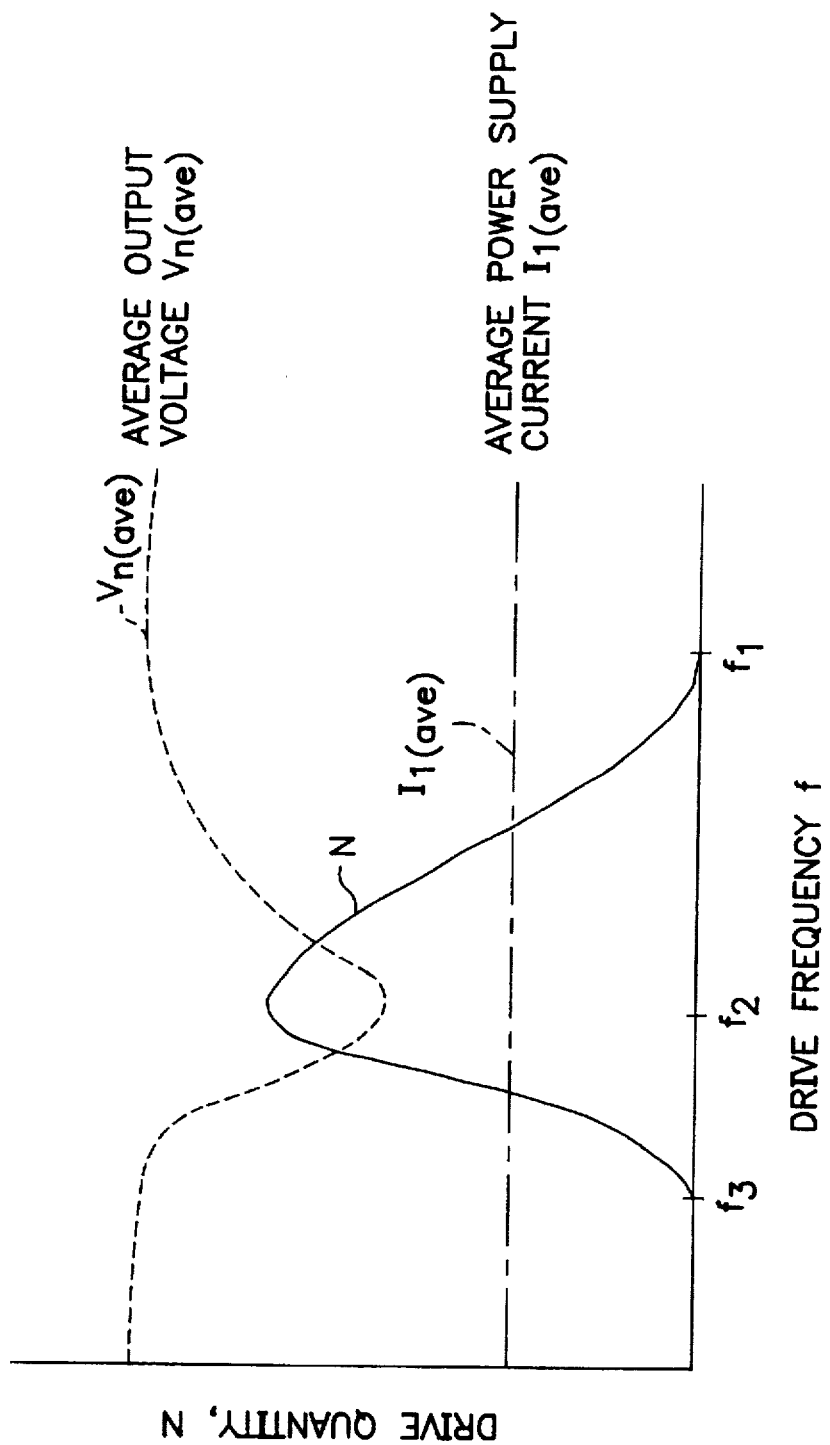
FIG. 6 is a diagram showing the drive characteristics of a vibration actuator when the vibration actuator is driven in accordance with embodiments of the present invention.

FIG. 6 is a diagram showing the drive characteristics of the vibration actuator 100 when driven by the drive device shown in FIG. 3 in accordance with embodiments of the present invention. More specifically, FIG. 6 shows a relationship between the drive frequency f, the drive quantity N, the average power supply current $I_{1(ave)}$ and the average output voltage $V_{n(ave)}$. In the diagram of FIG. 6, the drive frequency f is scanned, first from the high frequency side to the low frequency side of a drive frequency range, and then from the low frequency side to the high frequency side of the drive frequency range.

As shown in FIG. 6, the drive quantity N of the vibration actuator 100 gradually increases accompanying the fall of the drive frequency f when the drive frequency f is changed from the high frequency $f_1$ toward the low frequency side of the drive frequency range, until the drive quantity exhibits a maximum value at drive frequency $f_2$. After exhibiting a maximum value at the drive frequency $f_2$, the drive quantity N slowly decreases accompanying the fall of the drive frequency f, and becomes zero at and below the drive frequency $f_3$, without the cogging phenomenon occurring.

Moreover, the average value of the current $I_1$ supplied from the direct current power supply 4 normally remains at a constant value, irrespective of the value of the drive frequency f. However, the average output voltage $V_{n(ave)}$ decreases as the drive quantity N of the vibration actuator 100 becomes larger, until the average output voltage $V_{n(ave)}$ reaches a minimum at the drive frequency $f_2$ where the drive quantity N is a maximum. The average output voltage $V_{n(ave)}$ then increases as the drive quantity N becomes smaller.

Furthermore, as illustrated in FIG. 6, the drive quantity N, the average current value $I_{1(ave)}$, and the average output voltage $V_{n(ave)}$, continuously trace the same locus when the drive frequency f is scanned from both the low frequency side to the high frequency side of the drive frequency range, and from the high frequency side to the low frequency side. Specifically, the hysteresis characteristics exhibited when the vibration actuator 100 is driven using a prior art drive device are eliminated with the drive device of the present invention.

Moreover, in accordance with embodiments of the present invention, it is possible to omit the one-shot circuit 71 from the voltage generating circuit 6A or 6B shown in FIG. 4, and to perform the opening and closing of the switching elements 61, 67 directly using the logic signal $S_a$ or $S_b$. When the one-shot circuit 71 is omitted from the voltage generating circuits 6A, 6B, the ratio of the highest drive frequency (about 30 kHz) and lowest drive frequency (about 27 kHz) of the vibration actuator 100 is small, and the period for which the logic level of the logic signals $S_a$ and $S_b$ is "H" does not change greatly in the drive frequency region.

Figure 7:
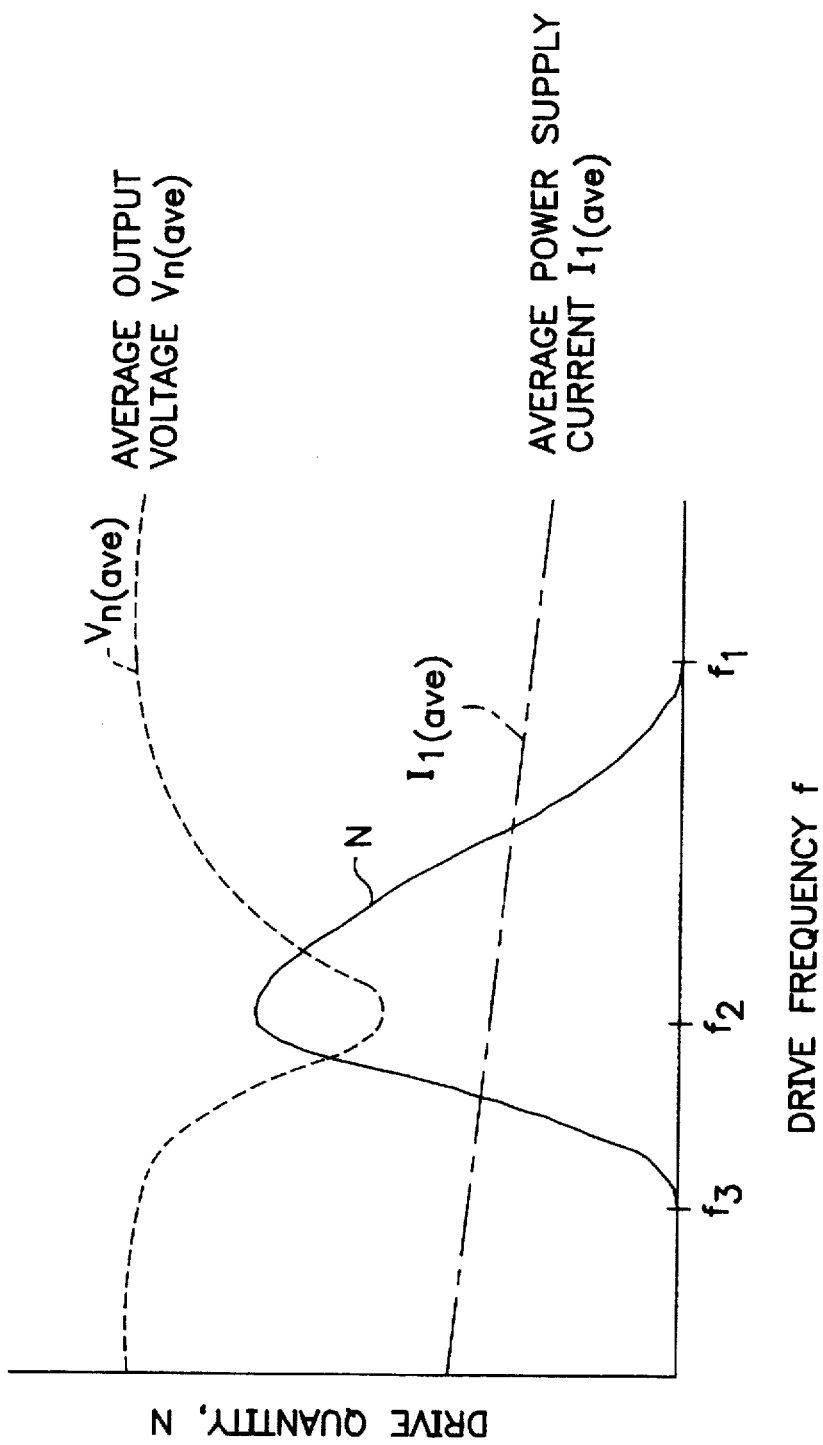
FIG. 7 is a diagram showing the drive characteristics of a vibration actuator when the vibration actuator is driven with a drive device which is not equipped with a one-shot circuit in accordance with embodiments of the present invention.

FIG. 7 is a diagram showing the drive characteristics of the vibration actuator 100 when the vibration actuator 100 is driven with voltage generating circuits 6A, 6B which do not include a one-shot circuit 71. As shown in FIG. 7, the average drive current $I_{1(ave)}$ exhibits a characteristic which rises to the left with respect to the drive frequency f as the drive frequency f decreases. However, the cogging phenomenon does not occur, nor do hysteresis characteristics of the drive quantity N.

Figure 9:
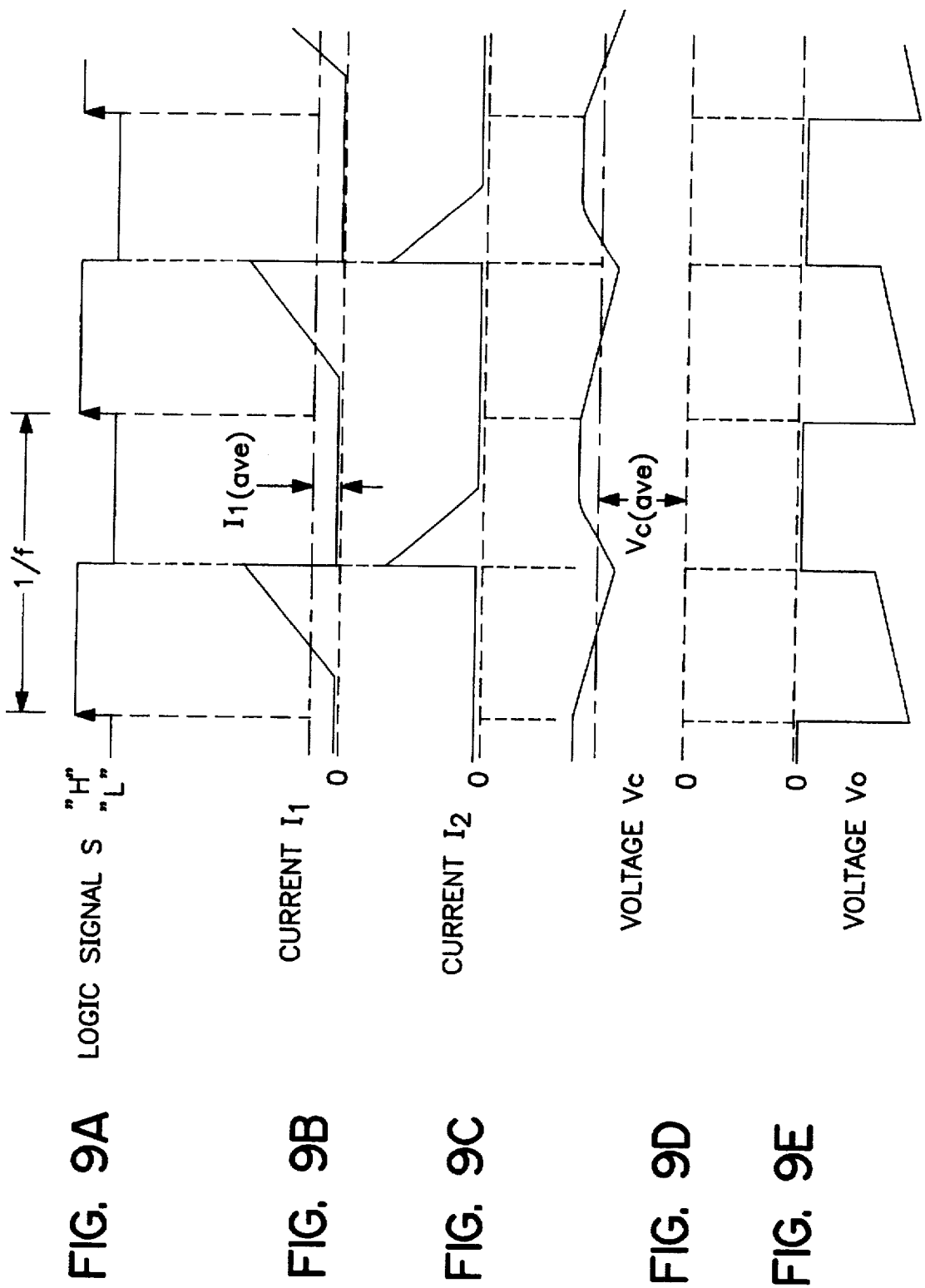
FIGS. 9A–9E are graphs showing the operation of a DC/AC converter in accordance with embodiments of the present invention.
Figure 10:
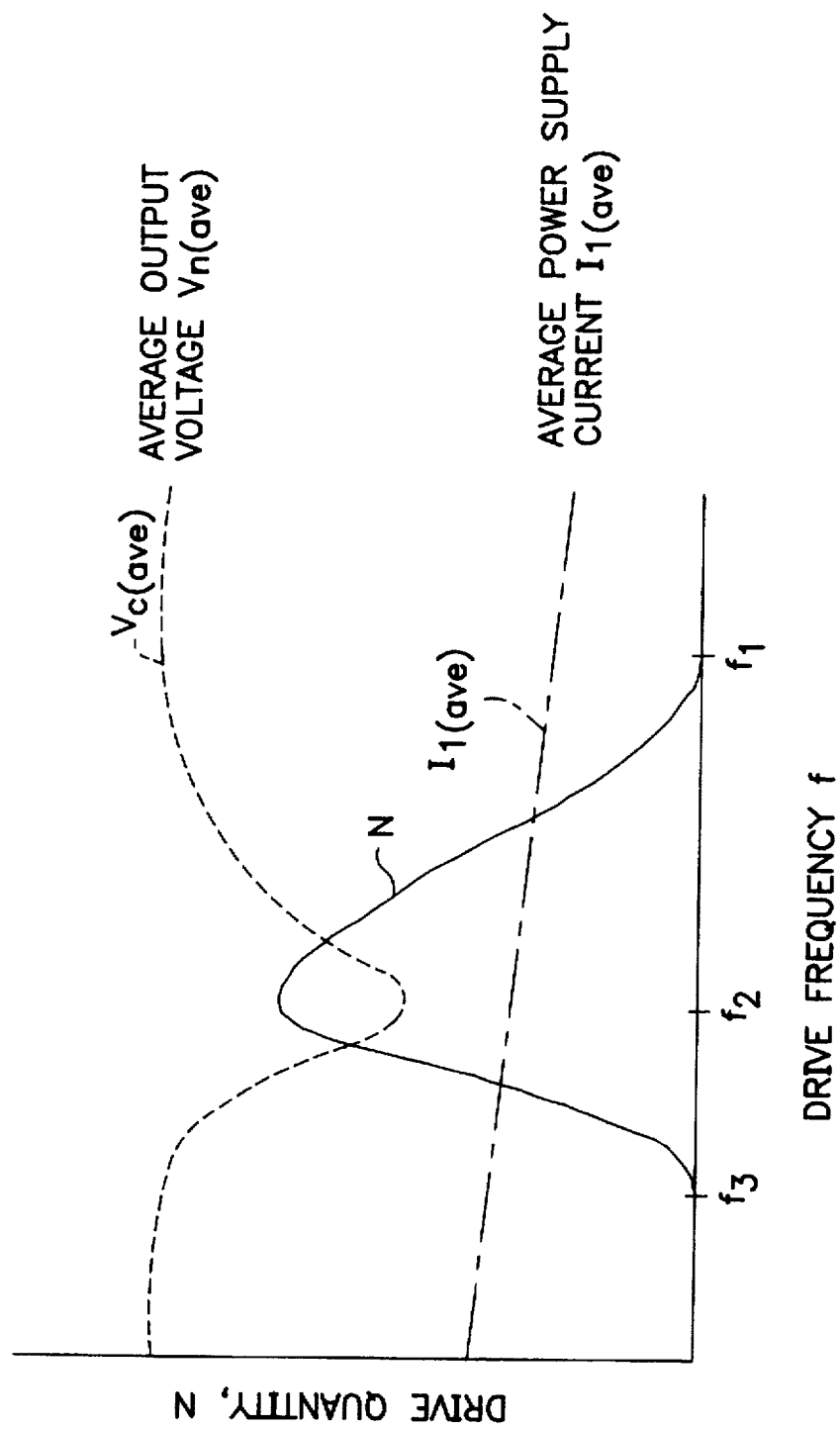
FIG. 10 is a diagram showing the drive characteristics of a vibration actuator when the vibration actuator is driven in accordance with embodiments of the present invention.
Figure 11A:
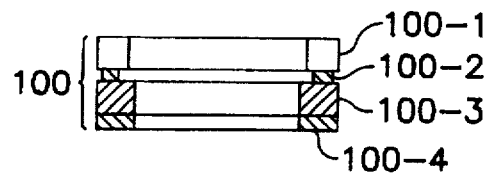
FIG. 11A is a cross-sectional view of a prior art vibration actuator.
Figure 11B:
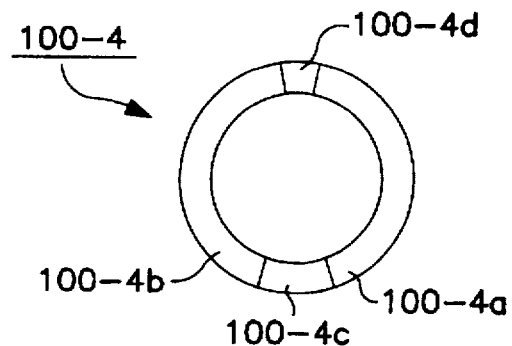
FIG. 11B is a plan view of a vibration body 100-4 of the prior art vibration actuator shown in FIG. 11A.
Figure 11C:
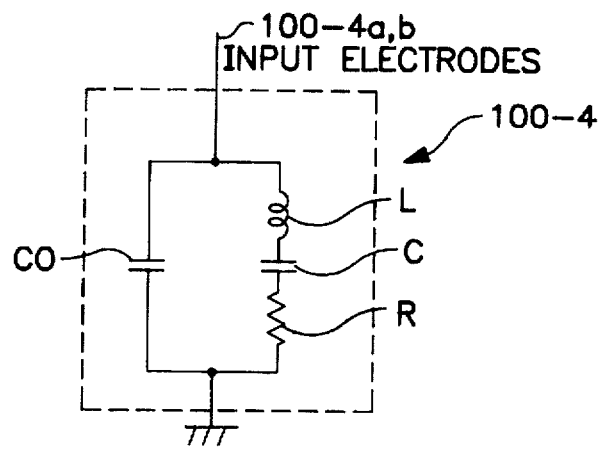
FIG. 11C is a circuit diagram of an equivalent circuit corresponding to the prior art vibration actuator 100 shown in FIG. 11A.
Figure 12:
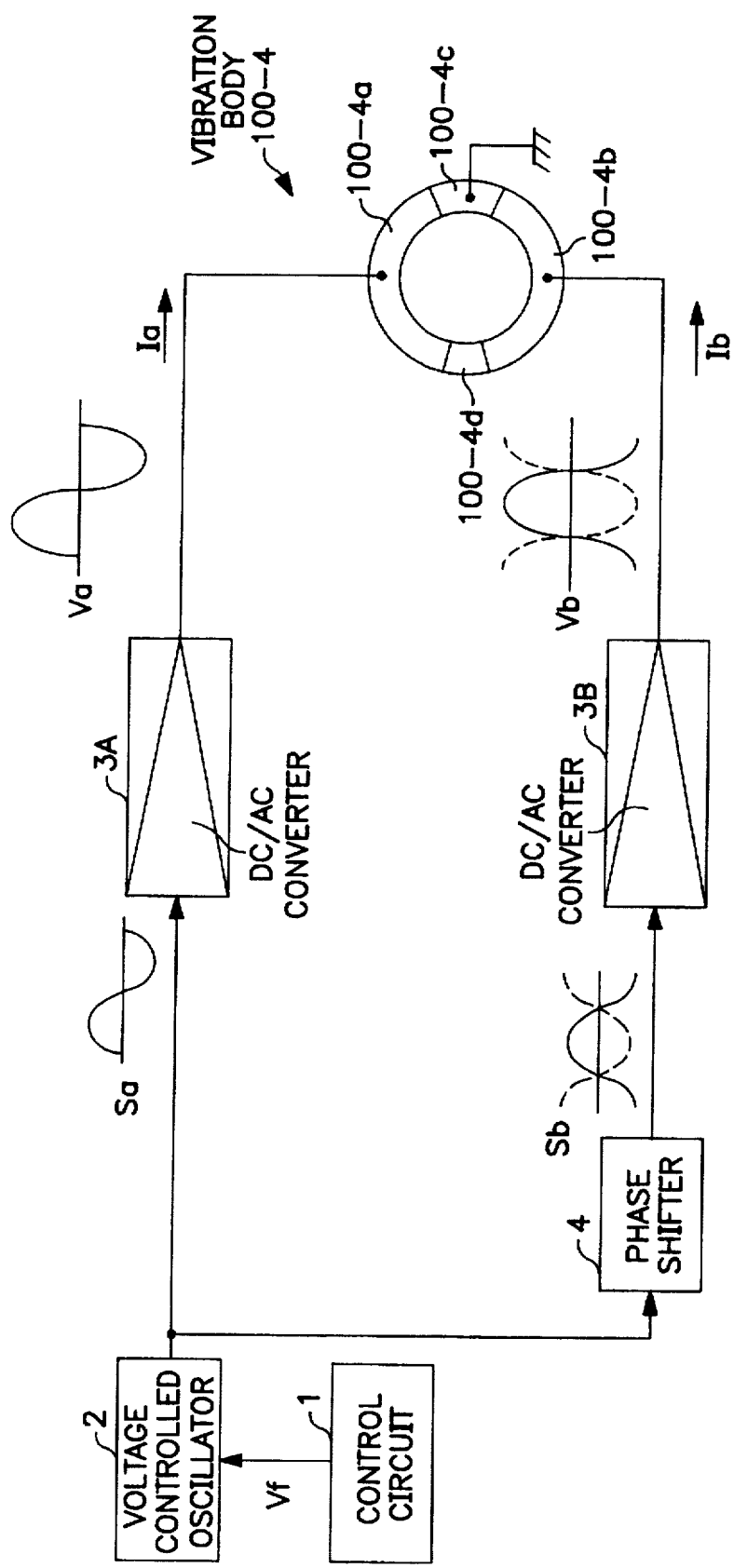
FIG. 12 is a block diagram of a prior art drive device for the vibration actuator shown in FIG. 11A.
Figure 13A:
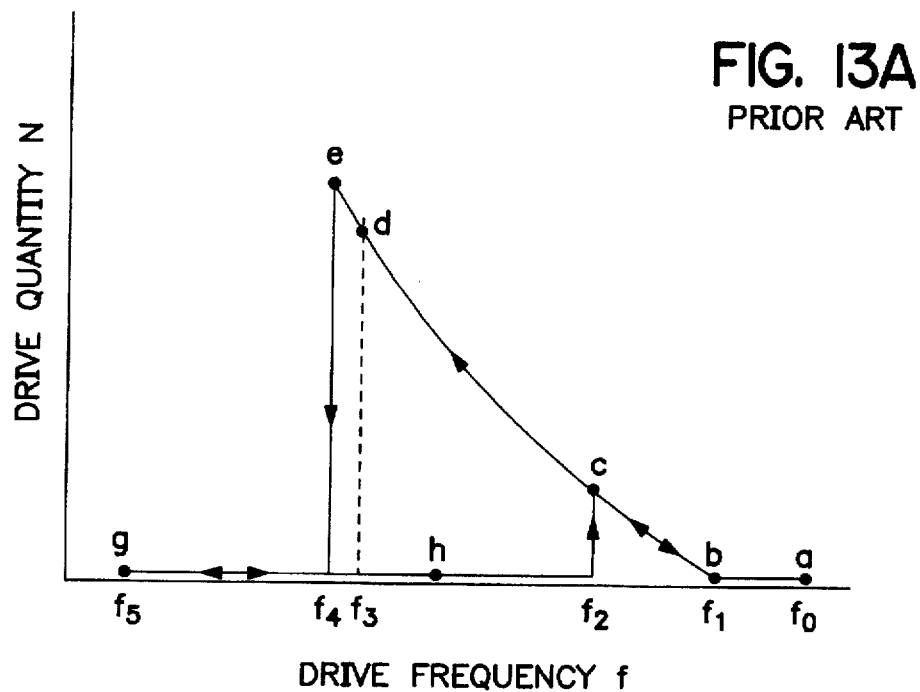
FIG. 13A is a diagram showing a relationship between a drive frequency f and a drive quantity N for the prior art vibration actuator.
Figure 13B:
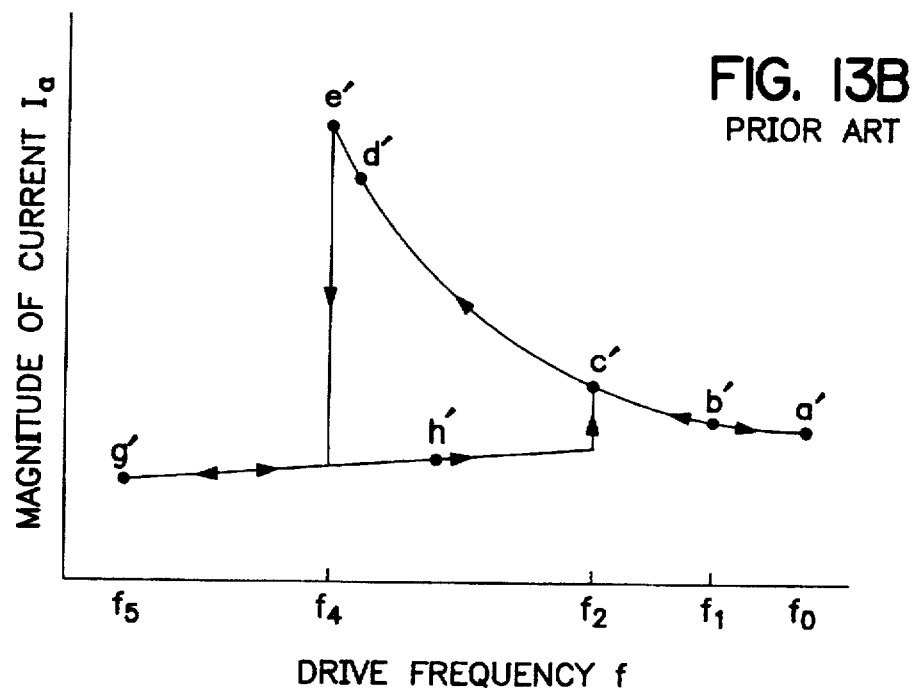
FIG. 13B is a diagram showing a relationship between a drive frequency f and a drive current $I_a$ for the prior art vibration actuator.

Another embodiment of the present invention will now be described below with reference to FIGS. 8–10. The embodiment of the present invention shown in FIGS. 8–10 is the same as the embodiment of the invention shown in FIG. 3, except that the drive device for the vibration actuator includes a DC-AC converter which also functions as a voltage generating circuit.

Figure 8:
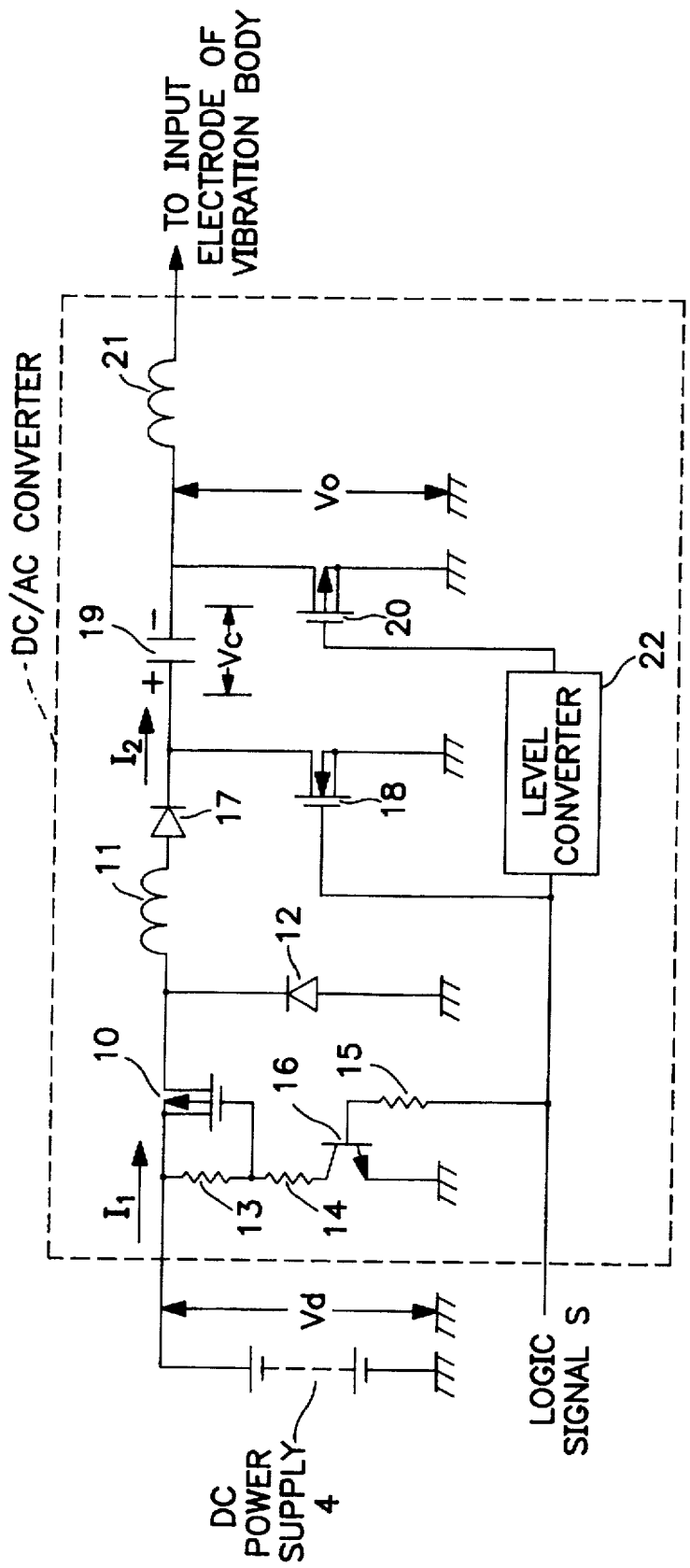
FIG. 8 is a circuit diagram of a DC/AC converter in accordance with embodiments of the present invention.

FIG. 8 is a circuit diagram showing the DC-AC converter which also functions as a voltage generating circuit in accordance with embodiments of the present invention. As shown in FIG. 8, the DC-AC converter includes a switching element 10 inserted between the direct current power supply 4, an inductive element 11 and a diode 12. The switching element 10 is placed in an ON state by operation of resistors 13, 14 and 15 together with transistor 16 when the logic level of the signal S output from the VCO 2 is "H". Further, the switching element 10 is placed in an OFF state when the logic level of the signal S is "L".

The inductive element 11 is connected at one terminal to the switching element 10, and at the other terminal to a switching element 18 via a diode 17. The voltage Vd of the direct current power supply 4 is impressed on one terminal of the inductive element 11 when the switching element 10 is ON, and when the switching element 10 is in the OFF state, the voltage Vd is cut off. The terminal of the switching element 18 which is not connected to the inductive element 11 is grounded. Accordingly, when the logic signal S is at the logic level "H", the switching element 18 is switched to the ON state, and the cathode terminal of the diode 17 is grounded. However, when the logic level of the logic signal S is "L", the switching element 18 is placed in the OFF state, and the cathode terminal of the diode 17 is disconnected from ground.

The cathode terminal of the diode 17 is connected to one terminal of a capacitor 19 (referred to as the "positive terminal" hereinbelow). Further, the other terminal of the capacitor 19 (referred to as the "negative terminal" hereinbelow) is connected to a switching element 20. Furthermore, the negative terminal of the capacitor 19 and the switching element 20 are connected via an inductive element 21 to the input electrode of the vibration body 100-4.

The terminal of the switching element 20 which is not connected to the inductive element 11 is grounded, and when the logic level of the logic signal S is "L", a terminal of the capacitor 19 is grounded. When the logic level of the logic signal is "H", the capacitor 19 is open circuited from ground.

Moreover, in FIG. 8, the switching element 18 is an n-channel MOS type FET, and the switching element 20 is a p-channel MOS type FET. Therefore, in accordance with the embodiment of the invention shown in FIG. 8, the logic signal S is input to the switching element 20 via a level converter 22 to convert the level of the logic signal S to that necessary for correct operation of the switching element 20.

FIGS. 9A–9E are graphs illustrating the operation of the DC-AC converter shown in FIG. 8. FIG. 9A is a graph of the logic signal S input to the DC-AC converter of FIG. 8. As shown in FIG. 9A, the logic signal S reverses its logic level at the drive frequency f of the vibration actuator 100. Therefore, the period of the logic signal S is 1/f.

FIG. 9B is a graph of the current $I_1$ flowing in the inductive element 11 from the direct current power supply 4. When the logic level of the logic signal S is "H", the switching elements 10, 18 are placed in the ON state, and the switching element 20 is placed in the OFF state. As a result, the voltage Vd of the direct current power supply 4 is impressed on the inductive element 11, and current $I_1$ flows through the inductive element 11 via the diode 17. The current $I_1$ flowing through the inductive element 11 from the direct current power supply 4 increases in proportion to the time for which the logic signal S is "H".

During the period that the logic level of the signal S is "H", the energy which is stored in the inductive element 11 becomes a current $I_2$ flowing through the diode 17, capacitor 19, switching element 20, and diode 12. FIG. 9C is a graph showing the current $I_2$. The current $I_2$, flowing into the capacitor 19 is stored as static electrical energy. Specifically, as shown in FIG. 9D, the capacitor 19 is charged, and a voltage Vc appears at both of its terminals.

When the logic level of the signal S becomes "L", the switching elements 10, 18 are both placed in the OFF state, and the switching element 20 is placed in the ON state. As a result, the direct current power supply 4 and the inductive element 11 are cut off, and the current $I_1$ does not flow. Moreover, a terminal of the capacitor 19 is grounded.

When the logic level of the signal S becomes "H", the switching element 18 is placed in the ON state, the positive terminal of the capacitor 19 is grounded, and a voltage Vc appears across the terminals of the capacitor 19. Consequently, by setting the voltage of one terminal of the capacitor 19 to ground when the logic level of the signal S is "H", $V_0$ is equal to $-Vc$, and when the logic level of the signal S is "L", $V_0$ becomes equal to zero (0). Specifically, at the negative terminal of the capacitor 19, the voltages $-V_c$ and zero (0) repeatedly appear at the drive frequency f (FIG. 9E).

By the change of the voltage $V_0$ as described above, the capacitor 19 generates an electrically resonant vibration due to the inductive element 21 and the electrostatic capacity of the vibration body 100-4. Since the energy of the resonant vibration is generated by the electrostatic energy of the capacitor 19 during the periods when the logic level of the signal S is "H", the voltage Vc of the capacitor discharges, and the stored electrostatic energy is decreased. The quantity by which the electrostatic energy is decreased depends on the impedance characteristics of the vibration body 100-4 whose changes are attributable to the drive frequency f. Accordingly, the average value $V_{c(ave)}$ of the voltage Vc of the capacitor changes accompanying changes of the drive frequency f.

FIG. 10 is a diagram showing the drive characteristics of the vibration actuator 100 when the vibration actuator 100 is driven with a drive device including the DC/AC converter shown in FIG. 8 in accordance with embodiments of the present invention. In FIG. 10, the drive frequency f is first scanned from the high frequency side to the low frequency side of the drive frequency range, and is then scanned from the low frequency side to the high frequency side of the drive frequency range.

As shown in FIG. 10, the average power supply current $I_{1(ave)}$ shows the characteristic of rising to the left as the drive frequency f decreases for reasons similar to those described with respect to FIG. 7. The average voltage $V_{c(ave)}$ of the capacitor 19 decreases with the increase of the drive quantity N of the vibration actuator 100, and increases as the drive quantity N becomes smaller. As is clear from FIG. 10, the cogging phenomenon does not occur when driving a vibration actuator 100 in accordance with the embodiment of the invention shown in FIG. 8. Moreover, the drive quantity N of the vibration actuator 100, the average power supply current $I_{1(ave)}$, and the average voltage $V_{c(ave)}$ of the capacitor 19 do not show hysteresis characteristics.

The embodiments of the present invention described hereinabove are exemplary, and the present invention is not limited to the specific structure described herein with reference to the figures. It will be recognized that the present invention encompasses any structure within the technological concept set forth in the appended claims.

For example, in the figures, the switching elements are represented as MOS type FETs which are switched according to appropriate signals for switching the MOS type FETs. However, switching elements other than MOS type FETs may be used which perform similar operations.

Further, the embodiments of the invention described herein employ an annular form of a vibration actuator. However, the present invention may also be applied to a linear form of vibration actuator.

In accordance with embodiments of the present invention as described hereinabove, it is possible to drive a vibration actuator without the cogging phenomenon occurring, and further, the drive characteristics of the vibration actuator exhibit no hysteresis, and it is possible easily to control the drive state of the vibration actuator.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A drive device for a vibration actuator having an electromechanical energy converting element to convert electrical energy into mechanical energy, comprising:

a voltage generating device to generate an alternating voltage and to provide the alternating voltage to the electromechanical energy converting element; and a voltage control device to control the alternating voltage generated by the voltage generating device such that the amplitude value or the effective value of the current supplied to the electromechanical energy converting element from the voltage generating device is constant.

2. A drive device for a vibration actuator as recited in claim 1, wherein the voltage generating device comprises an oscillating circuit to output an alternating voltage, and an amplifier circuit to amplify the alternating voltage output by the oscillating circuit, and the voltage control device comprises a current detection circuit to detect a current supplied to the electromechanical energy converting element from the voltage generating device, and an amplification factor control circuit to control the amplification factor of the amplifier circuit based on the detection result of the current detection circuit.

3. A drive device for a vibration actuator having an electromechanical energy converting element to convert electrical energy into mechanical energy, comprising:

a direct current power supply;

a voltage generating device to receive a supply of electric power from the direct current power supply and to output a voltage value which changes according to an excitation state of the electromechanical energy converting element; and a direct current-alternating current converter to convert the direct current voltage from the direct current power supply to an alternating voltage and to impress on the electromechanical energy converting element the alternating voltage, wherein the voltage generating device changes its output voltage value according to the excitation state of the electromechanical energy converting element such that the average current supplied from the direct current power supply during one cycle of the alternating voltage is constant during each period.

4. A drive device for a vibration actuator having an electromechanical energy converting element to convert electrical energy into mechanical energy, comprising:

a direct current power supply;

a voltage generating device to receive a supply of electric power from the direct current power supply and to output a voltage value which changes according to an excitation state of the electromechanical energy converting element;

an oscillator to output a logic signal of a predetermined frequency;

a phase shifter to shift the phase of the logic signal output by the oscillator by a predetermined amount; and a direct current-alternating current converter to convert the direct current voltage from the direct current power supply to an alternating voltage based on the logic signal from the phase shifter or on the logic signal from the oscillator, and to impress on the electromechanical energy converting element the alternating voltage, wherein the voltage generating device changes its output voltage value according to the excitation state of the electromechanical converting element, such that the average current supplied from the direct current power supply in one cycle of the alternating voltage is constant during each period.

5. A drive device for a vibration actuator as recited in claim 3, wherein the voltage generating device comprises:

an inductive element to receive a supply of current from the direct current power supply and to store electrical energy provided by the direct current power supply;

a connection unit to connect the direct current power supply to the inductive element; and a capacitor which is charged by the electrical energy stored in the inductive element, and which outputs a voltage to the direct current-alternating current converter, wherein the connection unit makes the average current supplied from the direct current power supply to the inductive element during one cycle of the alternating voltage constant during each period by limiting the connection time of the direct current power supply with the inductive element.

6. A drive device for a vibration actuator having an electromechanical energy converting element to convert electrical energy into mechanical energy, comprising:

a direct current power supply; and a direct current-alternating current converter to receive a direct current voltage from the direct current power supply, to convert the direct current voltage to an alternating voltage and to provide the alternating voltage to the electromechanical energy converting element, wherein the direct current-alternating current converter changes its output voltage value according to the excitation state of the electromechanical energy converting element, such that the average current supplied from the direct current power supply during one cycle of the alternating voltage is constant during each period.

7. A drive device for a vibration actuator including an electromechanical energy converting element to convert electrical energy into mechanical energy, comprising:

a voltage generating device to generate a voltage and to provide the voltage to the electromechanical energy converting element; and a voltage control device to control the voltage such that a current supplied to the electromechanical energy converting element from the voltage generating device is constant.

8. A drive device as recited in claim 7, wherein voltage generating device generates an alternating voltage and the voltage control device controls the alternating voltage generated by the voltage generating device such that the amplitude value or the effective value of the current supplied to the electromechanical energy converting element is constant.

9. A drive device as recited in claim 7, wherein the voltage generating device generates an alternating voltage and the voltage control device controls the alternating voltage generated by the voltage generating device such that the average current supplied to the electromechanical energy converting element is constant.

10. A drive device as recited in claim 8, wherein the voltage control device includes a current sensor to sense the current supplied to the electromechanical energy converting element, and the voltage generating device generates an alternating voltage to supply a constant current in accordance with the sensed current.

11. A drive device as recited in claim 10, wherein the voltage control device comprises:

a sensor to sense an amplitude of the alternating voltage generated by the voltage generating device;

a comparator to compare the sensed amplitude of the alternating voltage with a reference value; and an amplitude factor controller to control amplification of the voltage provided by the voltage generating device according to the result of the comparison by the comparator such that a constant current is supplied to the electromechanical energy converting element.

12. A drive device as recited in claim 7, wherein the voltage generating device comprises:

a control circuit to generate a voltage value;

an oscillator to receive the voltage value generated by the control circuit and to output a sine wave signal having a frequency corresponding to the voltage value generated by the control circuit; and an amplifier to amplify the sine wave signal output by the oscillator to produce an amplified alternating voltage signal which is impressed on the electromechanical energy converting element.

13. A drive device for a vibrator actuator as recited in claim 9, wherein the voltage control device comprises:

a direct current power supply;

a voltage generating circuit which receives the voltage generated by the direct current power supply and outputs a voltage value according to a frequency of alternating voltage generated by the voltage generating device such that an average current supplied from the direct current power supply is constant; and a direct current-alternating current converter to receive the voltage value output from the voltage generating circuit and the alternating voltage generated by the voltage generating device and to output an alternating voltage to the electromechanical energy converting element.

* * * * *